US011214723B2

(12) United States Patent
Yang et al.

(10) Patent No.: US 11,214,723 B2
(45) Date of Patent: Jan. 4, 2022

(54) SUPER CONCENTRATE ADDITIVE SOLUTION COMPOSITION

(71) Applicant: Prestone Products Corporation, Lake Forest, IL (US)

(72) Inventors: Bo Yang, Ridgefield, CT (US); Peter M. Woyciesjes, Woodbury, CT (US); Aleksei V. Gershun, Southbury, CT (US)

(73) Assignee: Prestone Products Corporation, Lake Forest, IL (US)

( * ) Notice: Subject to any disclaimer, the term of this patent is extended or adjusted under 35 U.S.C. 154(b) by 17 days.

(21) Appl. No.: 15/060,901

(22) Filed: Mar. 4, 2016

(65) Prior Publication Data

US 2016/0257868 A1   Sep. 8, 2016

Related U.S. Application Data

(60) Provisional application No. 62/128,204, filed on Mar. 4, 2015.

(51) Int. Cl.
*C09K 5/06* (2006.01)
*C09K 5/20* (2006.01)
(Continued)

(52) U.S. Cl.
CPC ............... *C09K 5/20* (2013.01); *C09K 5/06* (2013.01); *C23F 11/08* (2013.01); *C23F 11/18* (2013.01); *C23F 11/184* (2013.01); *C23F 11/188* (2013.01)

(58) Field of Classification Search
CPC ................................ C09K 5/20; C09K 5/06
(Continued)

(56) References Cited

U.S. PATENT DOCUMENTS 4,457,852 A * 7/1984 Bosen ............... C23F 11/08
                                                   252/75
4,772,408 A * 9/1988 Mohr ............... C09K 5/20
                                                   252/75
(Continued)

FOREIGN PATENT DOCUMENTS

EP         0042937       1/1982
JP         2012508279    4/2012
(Continued)

OTHER PUBLICATIONS

International Search Report and Written Opinion, Application No. PCT/US2016/020831, dated May 17, 2016.
(Continued)

*Primary Examiner* — Jane L Stanley
(74) *Attorney, Agent, or Firm* — Barnes & Thornburg LLP; Gregory H. Zayia

(57) ABSTRACT

A super concentrate additive solution is disclosed herein. A super concentrate additive solution can be added into a heat transfer fluid to improve corrosion protection performance and to extend the service life of a heat transfer system or the fluids therein. A method includes adding a super concentrate additive solution to a heat transfer fluid to form a super additive heat transfer fluid and adding the mixture to a heat transfer system. A super concentrate additive solution can also be used in flexible production of a high corrosion protection performance heat transfer fluid concentrate, pre-diluted heat transfer fluids, or ready-for-use heat transfer fluids.

39 Claims, 5 Drawing Sheets

(51) Int. Cl.
*C23F 11/18* (2006.01)
*C23F 11/08* (2006.01)

(58) Field of Classification Search
USPC .......................................................... 252/74
See application file for complete search history.

(56) References Cited

U.S. PATENT DOCUMENTS

| | | | | |
|---|---|---|---|---|
| 5,104,562 | A * | 4/1992 | Kardos | C09K 5/20 |
| | | | | 252/75 |
| 5,422,008 | A * | 6/1995 | Woyciesjes | C09K 5/20 |
| | | | | 210/662 |
| 5,454,967 | A | 10/1995 | Pfitzner et al. | |
| 5,662,803 | A * | 9/1997 | Young | C02F 1/50 |
| | | | | 210/698 |
| 5,766,506 | A * | 6/1998 | Mendoza | C09K 5/10 |
| | | | | 210/698 |
| 5,843,330 | A * | 12/1998 | Barbour | C09K 3/185 |
| | | | | 106/13 |
| 5,888,385 | A * | 3/1999 | Ische | F01M 11/0458 |
| | | | | 210/167.31 |
| 6,126,852 | A * | 10/2000 | Turcotte | C09K 5/20 |
| | | | | 252/76 |
| 6,143,243 | A | 11/2000 | Gershun et al. | |
| 6,203,719 | B1 * | 3/2001 | Turcotte | C09K 5/10 |
| | | | | 252/396 |
| 6,572,789 | B1 | 6/2003 | Yang et al. | |
| 6,689,289 | B1 | 2/2004 | Maes et al. | |
| 6,821,453 | B2 * | 11/2004 | Chon | C09K 3/185 |
| | | | | 106/13 |
| 6,861,009 | B1 * | 3/2005 | Leist | C09K 3/185 |
| | | | | 106/13 |
| 7,387,748 | B2 | 6/2008 | Pellet et al. | |
| 8,613,866 | B1 | 12/2013 | Yang et al. | |
| 8,617,415 | B2 * | 12/2013 | Yang | C09K 5/20 |
| | | | | 252/68 |
| 8,617,416 | B1 | 12/2013 | Yang et al. | |
| 9,796,899 | B2 * | 10/2017 | Ahlnas | C09K 5/04 |
| 2003/0063998 | A1 * | 4/2003 | Ghosh | C08F 8/32 |
| | | | | 422/16 |
| 2006/0202156 | A1 * | 9/2006 | Sapienza | C09K 3/18 |
| | | | | 252/70 |
| 2013/0105407 | A1 | 5/2013 | Kormann et al. | |
| 2014/0119983 | A1 * | 5/2014 | Yang | C09K 5/10 |
| | | | | 422/7 |
| 2019/0225855 | A1 * | 7/2019 | Yang | C23F 11/187 |

FOREIGN PATENT DOCUMENTS

| | | |
|---|---|---|
| RU | 2240338 | 11/2004 |
| RU | 2360939 | 7/2009 |
| WO | 1995/29220 | 11/1995 |
| WO | WO 2007/050568 | 5/2007 |
| WO | WO 2010/052290 | 5/2010 |
| WO | WO 2014/039284 | 3/2014 |

OTHER PUBLICATIONS

"Standard Specification for Glycol Base Engine Coolant for Automobile and Light-Duty Service," *ASTM International Designation: D3306-14.* May 2014, pp. 1-7.

Yang et al., "New Electrochemical Methods for the Evaluation of Localized Corrosion in Engine Coolants," *Journal of ASTM International.* vol. 4, No. 1, 2006, pp. 1-14.

Supplementary Search Report issued in European App. No. 16759559 (dated 2018).

Office Action issued in Russian Patent Appl. No. 2017133852 (dated Aug. 1, 2019).

Office Action issued in Appl. No. CN 201680013373 (dated Aug. 28, 2020).

Office Action issued in Appl. No. JP 2017-546164 (dated Dec. 25, 2020).

* cited by examiner

SUPER CONCENTRATE ADDITIVE SOLUTION COMPOSITION

RELATED APPLICATIONS

This application claims the benefit of U.S. Provisional Application No. 62/128,204, filed Mar. 4, 2015. The entire contents of the priority document are hereby incorporated herein by reference.

TECHNICAL FIELD

The present teachings relate generally to a super concentrate additive solution and, in some embodiments, a super concentrate solution used as a heat transfer fluid additive for cooling systems (e.g., including but not limited to cooling systems having components that contain significant amounts of aluminum, and including but not limited to aluminum with controlled atmosphere brazing (CAB) brazed surfaces in contact with the fluid).

BACKGROUND

Modern vehicle engines generally require a heat transfer fluid (liquid coolant) to provide long-lasting, year-round protection of their cooling systems. The primary requirements of the heat transfer fluids are that they provide efficient heat transfer to control and maintain engine temperature for efficient fuel economy and lubrication, and prevent engine failures due to freeze-up, boiling-over, or over-heating. An additional key requirement of a heat transfer fluid is that it provides corrosion protection of all cooling system metals over a wide range of temperature and operating conditions. Aluminum corrosion protection for engine block, cylinder head, water pump, heat exchangers and other components made from aluminum or aluminum alloys is particularly important. Beyond metal protection, corrosion protection helps the heat transfer fluid to fulfill its primary function of transferring excess heat from the engine to the radiator for dissipation.

SUMMARY

The scope of the present invention is defined solely by the appended claims, and is not affected to any degree by the statements within this summary.

A super concentrate additive solution is disclosed herein. A super concentrate additive solution can be added into a heat transfer fluid to improve corrosion protection performance and to extend the service life of a heat transfer system and its components or the fluids therein. A method includes adding a super concentrate additive solution in accordance with the present teachings to a heat transfer fluid to form a super additive heat transfer fluid, and adding the resultant mixture to a heat transfer system. A super concentrate additive solution can also be used in flexible production of a high corrosion protection performance heat transfer fluid concentrate, pre-diluted heat transfer fluids, ready-for-use heat transfer fluids, or as a pre-charge additive for protecting CAB brazed components in a heat transfer system.

In some embodiments, a super concentrate additive solution in accordance with the present teachings includes water, a freezing point depressant (e.g., a glycol such as ethylene glycol, propylene glycol, or a mixture thereof), phosphoric acid, a water soluble polymer, and a compound selected from the group consisting of a magnesium compound, a lithium compound, a calcium compound, a strontium compound, and a combination thereof. In some embodiments, the compound includes a combination of a magnesium compound and a calcium compound. In some embodiments, the pH of the super concentrate additive solution is less than about 5.5.

DETAILED DESCRIPTION

Figure 1:
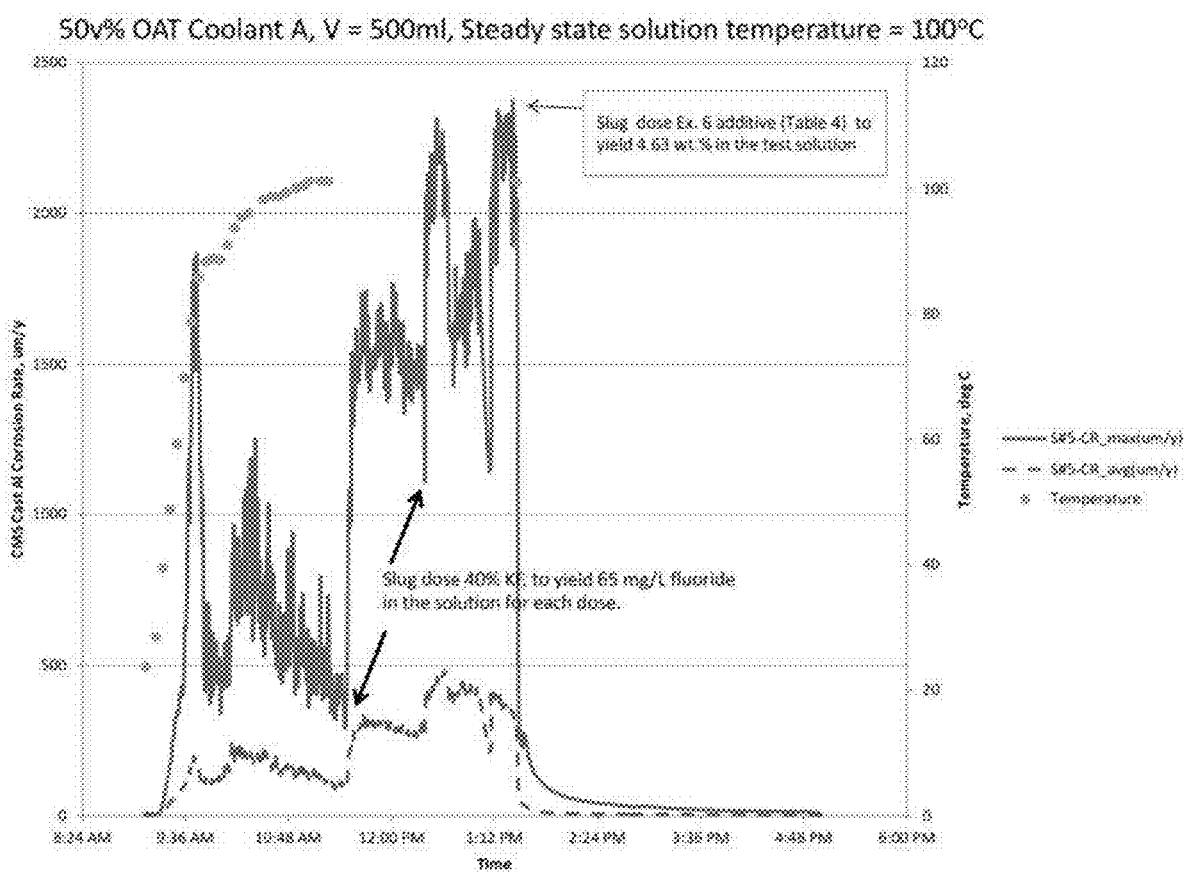
FIG. 1 shows the effect of a slug dose of heat transfer fluid super concentrate additive on corrosion of cast aluminum SAE329 in 50 vol. % commercial OAT coolant A in the presence of 130 ppm fluoride ions.

To ensure long service life and to fulfill design functions, metal components used in automotive cooling systems have to be protected from corrosion by an engine coolant. In addition, an engine coolant should be compatible with non-metals (such as hoses, gaskets and plastics) used in cooling systems. Excessive corrosion or degradation of material used in cooling systems can lead to a substantial reduction in the strength of a material or component, to a loss of coolant from the system, and to the subsequent malfunction of one or more of the cooling system components. All of these events may result in engine failure. Furthermore, even relatively mild corrosion can result in formation of corrosion products that can form scales or deposits on heat transfer surfaces. These scales or deposits can greatly reduce heat transfer rate. The thermal conductivity for a nonporous scale is about 1.04 to 3.46 W/mK at 25° C. and that of deposit or porous scale can be about 0.35 W/mK at 25° C. These values are much lower than the thermal conductivities of various metals used in cooling systems (e.g., 401 W/mK at 25° C. for copper; 250 W/mK at 25° C. for aluminum, 156 W/mK at 25° C. for magnesium, 109 W/mK at 25° C. for admiralty brass, 55 W/mK at 25° C. for cast iron, or 16 W/mK @ 25° C. for stainless steel). In short, the thermal conductivity of scales and deposits are in the range of a fireclay brick which is used as heat insulation material at 500° C. (1.4 W/mK). Excessive scale or corrosion product deposition can also lead to restriction of coolant flow in the radiator and heater core tubes, even plugging the heater core and/or radiator. Substantial heat transfer rate reduction and flow restriction of the coolant can lead to overheating of the engine.

In addition to providing reliable corrosion protection for various metallic components in the cooling systems, an engine coolant should also have following properties to fulfill its requirements for use as a year-round functional fluid for a vehicle: high thermal conductivity; high heat capacity or high specific heat; good fluidity within the temperature range of use; high boiling point; low freeze point; low viscosity; low toxicity and safe to use; cost effective and have adequate supply; chemically stable over the temperature and conditions of use; low foaming tendency; and good material compatibility (i.e., does not corrode, erode or degrade system materials, including both metallic and nonmetallic materials). The super concentrate additive solutions described hereinbelow may be used to provide one or more of these properties.

By way of general introduction, super concentrate additive solutions with the capacity to yield coolant concentrate products meeting the ASTM D3306-2007 property and performance requirements, including the freeze point requirement, have been discovered and are described hereinbelow. Super concentrate additive solutions in accordance with the present teachings, surprisingly and unexpectedly, exhibit good storage stability at acidic pH (e.g., less than 7.0). By contrast, a heat transfer fluid used as an engine coolant as defined in ASTM D3306 would not have the acidic pH of a super concentrate additive solution in accordance with the present teachings since the low acidity could be corrosive to various engine components.

In some embodiments, when a super concentrate additive solution in accordance with the present teachings is blended with a heat transfer fluid concentrate, the resultant mixture meets the properties and performance requirements of ASTM D3306. Moreover, a super concentrate additive solution in accordance with the present teachings may also be used in a number of other applications. By way of example, a super concentrate additive solution may be used in flexible production of a high corrosion protection performance heat transfer fluid concentrate; pre-diluted heat transfer fluids; or ready-for-use heat transfer fluid by mixing the super concentrate additive with polyhydroxy alcohols (e.g., glycols and glycerol), water, antifoam, colorants, and/or other optional heat transfer fluid additives. A method of production of a high corrosion protection performance heat transfer fluid concentrate includes mixing a disclosed super concentrate additive solution with a polyhydroxy alcohol. A method of production of a high corrosion protection performance heat transfer fluid concentrate includes mixing a disclosed super concentrate additive solution with a polyhydroxy alcohol and at least one of water, antifoam, and colorants. A method of production of a high corrosion protection performance heat transfer fluid concentrate includes mixing a disclosed super concentrate additive solution with a polyhydroxy alcohol, a corrosion inhibitor, and at least one of water, antifoam, and colorants.

In some embodiments, a super concentrate additive solution can be added into a heat transfer fluid to improve corrosion protection performance and to extend the service life of a heat transfer system or the fluids therein. A method includes adding a super concentrate additive solution to a heat transfer fluid to form a super additive heat transfer fluid and adding the mixture to a heat transfer system.

Coolant concentrate solutions for heat transfer fluids that are not further diluted by adding water are generally not used in engine cooling systems due to their relatively low heat transfer coefficient (or specific heat), high viscosity, and high freeze point. Coolant concentrates are usually diluted to 30 to 60 vol. % solutions by adding water before being used in engine cooling systems as heat transfer fluids. Vehicle manufacturers typically use 50 vol. % coolant concentrate diluted by water as factory fill fluid in the vehicle cooling system. Coolant products that are pre-diluted by water to contain 30 to 60 vol. % coolant concentrate are ready-for-use coolant because no additional water is needed when they are added into the vehicle cooling system. In accordance with the present teachings, a super concentrate additive solution may be mixed with water or another heat transfer fluid to produce a desired heat transfer fluid.

It is to be understood that elements and features of the various representative embodiments described below may be combined in different ways to produce new embodiments that likewise fall within the scope of the present teachings.

By way of introduction, a super concentrate additive solution in accordance with the present teachings includes (a) water; (b) a freezing point depressant; (c) phosphoric acid; (d) a water soluble polymer; and (e) a compound selected from the group consisting of a magnesium compound, a lithium compound, a calcium compound, a strontium compound, and combinations thereof. In some embodiments, the super concentrate additive solution includes a magnesium compound and a calcium compound. In some embodiments, the super concentrate additive solution has an acidic pH (e.g., less than 7.0 and, in some embodiments, less than about 5.5).

In some embodiments, a super concentrate additive solution includes deionized water, demineralized water, or softened water. When a heat transfer fluid super concentrate is used to blend heat transfer fluid concentrate, an embodiment contains between 14% and 38% water by total weight of a super concentrate. Another embodiment contains between 19% and 35% water by total weight of a heat transfer fluid super concentrate.

In some embodiments, a super concentrate additive solution includes a freezing point depressant. A freezing point depressant in a disclosed heat transfer fluid super concentrate includes alcohol or a mixture of alcohols, such as monohydric or polyhydric alcohols, and mixtures thereof. An alcohol includes methanol; ethanol; propanol; butanol; furfurol; furfuryl alcohol; tetrahydrofurfuryl alcohol; ethoxylated furfuryl alcohol; ethylene glycol; diethylene glycol; triethylene glycol; 1,2-propylene glycol; 1,3-propylene glycol; dipropylene glycol; butylene glycol; glycerol; glycerol-1,2-dimethyl ether; glycerol-1,3-dimethyl ether; monoethylether of glycerol; sorbitol; 1,2,6-hexanetriol; trimethylopropane; alkoxy alkanols, such as methoxyethanol; and mixtures thereof.

A freezing point depressant concentration can be about 0 to about 60 wt. % of a heat transfer fluid super concentrate. In another embodiment, a freezing point depressant concentration can be about 0 to about 50 wt. % of a heat transfer fluid super concentrate. In yet another embodiment, a freezing point depressant concentration can be about 5 to about 40 wt. % of a heat transfer fluid super concentrate. In a further embodiment, a freezing point depressant concentration can be about 11 to about 25 wt. % of a heat transfer fluid super concentrate. In some embodiments, a freezing point depressant can be about 10 wt. %, 11 wt. %, 12 wt. %, 15 wt. %, 20 wt. %, or about 25 wt. % of a super concentrate additive.

The amount of freezing point depressant in a super concentrate additive solution in accordance with the present teachings may be one of several different values or fall within one of several different ranges. For example, it is within the scope of the present disclosure to select an amount of the freezing point depressant to be one of the following values: about 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, and 60% by weight of the composition. It is also within the scope of the present disclosure for the amount of the freezing point depressant to fall within one of many different ranges. In a first set of ranges, the amount of the freezing point depressant is in one of the following ranges: about 12% to 60%, 13% to 60%, 14% to 60%, 15% to 60%, 16% to 60%, 17% to 60%, 18% to 60%, 19% to 60%, 20% to 60%, 21% to 60%, 22% to 60%, 23% to 60%, 24% to 60%, 25% to 60%, 26% to 60%, 27% to 60%, 28% to 60%, 29% to 60%, 30% to 60%, 31% to 60%, 32% to 60%, 33% to 60%, 34% to 60%, 35% to 60%, 36% to 60%, 37% to 60%, 38% to 60%, 39% to 60%, 40% to 60%, 41% to 60%, 42% to 60%, 43% to 60%, 44% to 60%, 45% to 60%, 46% to 60%, 47% to 60%, 48% to 60%, 49% to 60%, or 50% to 60% by weight of the composition. In a second set of ranges, the amount of the freezing point depressant is in one of the following ranges: about 15% to 60%, 15% to 59%, 15% to 58%, 15% to 57%, 15% to 56%, 15% to 55%, 15% to 54%, 15% to 53%, 15% to 52%, 15% to 51%, 15% to 50%, 15% to 49%, 15% to 48%, 15% to 47%, 15% to 46%, 15% to 45%, 15% to 44%, 15% to 43%, 15% to 42%, 15% to 41%, 15% to 40%, 15% to 39%, 15% to 38%, 15% to 37%, 15% to 36%, 15% to 35%, 15% to 34%, 15% to 33%, 15% to 32%, 15% to 31%, 15% to 30%, 15% to 29%, 15% to 28%, 15% to 27%, 15% to 26%, and 15% to 25%, 15% to 24%, 15% to 23%, 15% to 22%, 15% to 21%, or 15% to 20% by weight of the composition. In a third set of ranges, the amount of the freezing point depressant is in one of the following ranges: about 15% to 59%, 16% to 58%, 17% to 57%, 18% to 56%, 19% to 55%, 20% to 54%, 21% to 53%, 22% to 52%, 23% to 51%, 24% to 50%, 25% to 49%, 26% to 48%, 27% to 47%, 28% to 46%, 29% to 45%, or 30% to 44% by weight of the composition.

In some embodiments, a super concentrate additive includes phosphoric acid. An active phosphoric acid concentration in a heat transfer fluid super concentrate can be about 1 wt. % to about 55 wt. %. In some embodiments, an active phosphoric acid concentration can be about 2 wt. % to 45 wt. % of total weight of a heat transfer fluid super concentrate. In another embodiment, an active phosphoric acid concentration can be about 3 wt. % to about 40 wt. % of total weight of a heat transfer fluid super concentrate. In a further embodiment, an active phosphoric acid concentration can be about 3.5 wt. % to about 39 wt. %. In some embodiments, phosphoric acid can be about 1 wt. %, about 2 wt. %, about 3 wt. %, about 5 wt. %, about 10 wt. %, about 15 wt. %, about 20 wt. %, about 25 wt. %, about 30 wt. %, about 35 wt. %, about 40 wt. %, about 45 wt. %, about 50 wt. %, or about 55 wt. % of a super concentrate additive. Part or all of phosphoric acid in a heat transfer fluid super concentrate can be replaced or substituted by alkali metal phosphate salts, including mono-alkali-metal phosphate salts, di-alkali-metal phosphate salts and tri-alkali-metal phosphate salts, hydrates of the alkali metal phosphate salts, and mixtures thereof. Alkali metal phosphate salts suitable for use include monosodium phosphate, monopotassium phosphate, disodium phosphate, dipotassium phosphate, trisodium phosphate, tripotassium phosphate, monosodium phosphate monohydrate, monosodium phosphate dehydrate, disodium phosphate dihydrate, disodium phosphate heptahydrate, disodium phosphate octahydrate, disodium dodecahydrate, trisodium phosphate, trisodium phosphate hemihydrate, trisodium phosphate hexahydrate, trisodium phosphate octahydrate, trisodium phosphate dodecahydrate, and combinations thereof. Alkali metal di- and polyphosphate salts can also be used in heat transfer fluid super concentrates.

In some embodiments, a super concentrate additive includes one or more water soluble (polyelectrolyte) polymers. A water soluble polymer includes acrylate based homo-, co- or ter-polymers. Concentration of water soluble polymer in a heat transfer fluid super concentrate can be about 0.15 wt. % to about 20 wt. %. In another embodiment, concentration of water soluble polymer in a heat transfer fluid super concentrate can be about 0.3 wt. % to about 17 wt. %. In yet another embodiment, concentration of a water soluble polymer in a heat transfer fluid super concentrate can be about 5 wt. % to about 15 wt. %. In some embodiments, one or more water soluble polymers can be about 1 wt. %, about 2 wt. %, about 3 wt. %, about 5 wt. %, about 10 wt. %, about 12 wt. %, about 15 wt. %, about 16 wt. %, about 17 wt. %, about 18 wt. %, about 19 wt. %, or about 20 wt. % of a super concentrate additive.

Illustrative examples of water soluble polymers suitable for use in a heat transfer fluid super concentrate include water soluble polymers such as polyelectrolyte dispersants derived from a polymerizable monomer containing at least one group selected from unsaturated carboxylic acids or salts, unsaturated amides, unsaturated acid anhydrides, unsaturated nitriles, unsaturated carbonyl halides, unsaturated carboxylate esters, unsaturated ethers, unsaturated alcohols, unsaturated sulfonic acids or salts, unsaturated phosphonic acids or salts, unsaturated phosphinic acids or salts, or combinations thereof.

In general, water soluble polymers suitable for use in a heat transfer fluid super concentrate include homopolymers, copolymers, terpolymers, and inter-polymers having (1) at least one monomeric unit containing a $C_3$ to $C_{16}$ monoethylenically unsaturated mono- or dicarboxylic acid or their alkali metal or ammonium salts; or (2) at least one monomeric unit containing a $C_3$ to $C_{16}$ monoethylenically unsaturated mono- or dicarboxylic acid derivative such as an amide, nitrile, carboxylate ester, acid halide (e.g., chloride), acid anhydride, or combination thereof. In some embodiments, a water soluble polymer suitable for use herein may include at least 5% (up to at least 10%) mer units of (1) or (2).

Examples of suitable monocarboxylic acids for producing water soluble polymers include acrylic acid, methacrylic acid, ethyl acrylic acid, vinylacetic acid, allylacetic acid, and crotonic acid.

Examples of monocarboxylic acid esters suitable for producing water soluble polymers include butyl acrylate, n-hexyl acrylate, t-butylaminoethyl methacrylate, diethylaminoethyl acrylate, hydroxyethyl methacrylate, hydroxyethyl acrylate, hydroxypropyl acrylate, hydroxypropyl methacrylate, diethylaminoethyl methacrylate, dimethylaminoethyl methacrylate, dimethylaminoethyl acrylate, methyl acrylate, methyl methacrylate, tertiary butylacrylate, and vinyl acetate.

Examples of dicarboxylic acids suitable for producing water soluble polymers include maleic acid, itaconic acid, fumaric acid, citaconic acid, mesaconic acid, and methylenemalonic acid.

Examples of amides suitable for producing water soluble polymers include acrylamide (or 2-propenamide), methacrylamide, ethyl acrylamide, propyl acrylamide, N-t-butylacrylamide, tertiary butyl methacrylamide, tertiary octyl acrylamide, N,N-dimethylacrylamide (or N, N-dimethyl-2-propenamide), dimethylaminopropyl methacrylamide, cyclohexyl acrylamide, benzyl methacrylamide, vinyl acetamide, sulfomethylacrylamide, sulfoethylacrylamide, 2-hydroxy-3-sulfopropyl acrylamide, sulfophenylacrylamide, N-vinyl formamide, N-vinyl acetamide, 2-hydroxy-3-sulfopropyl acrylamide, N-vinyl pyrrolidone (a cyclic amide), 2-vinylpyridene, 4-vinylpyridenem and carboxymethylacrylamide.

Examples of anhydrides suitable for producing water soluble polymers include maleic anhydride (or 2, 5-furandione) and succinic anhydride.

Examples of nitriles suitable for producing water soluble polymers include acrylonitrile and methacrylonitrile.

Examples of acid halides suitable for producing water soluble polymers include acrylamidopropyltrimethylammonium chloride, diallyldimethylammonium chloride, and methacrylamidopropyltrimethylammonium chloride.

In addition, water soluble polymers containing at least one monomeric unit of the following monomers may also be used: allylhydroxypropylsulfonate, AMPS or 2-acrylamido-2-methylpropane sulfonic acid, polyethyleneglycol monomethacrylate, vinyl sulfonic acid, styrene sulfonic acid, acrylamidomethyl propane sulfonic acid, methallyl sulfonic acid, allyloxybenzenesulfonic acid, 1,2-dihydroxy-3-butene, allyl alcohol, allyl phosphonic acid, ethylene glycoldiacrylate, aspartic acid, hydroxamic acid, 2-ethyl-oxazoline, adipic acid, diethylenetriamine, ethylene oxide, propylene oxide, ammonia, ethylene diamine, dimethylamine, diallyl phthalate, 3-allyloxy-2-hydroxy propane sulfonic acid, polyethylene glycol monomethacrylate, sodium styrene sulfonate, and an alkoxylated allyl alcohol sulfonate, and combinations containing at least one of the foregoing.

In some embodiments, a water soluble polymer suitable for use in a heat transfer fluid super concentrate additive includes at least 5 mole % of mer units (i.e., as polymerized units) resulting from polymerization of one or more monomers selected from the group consisting of acrylic acid, methacrylic acid, crotonic acid, vinyl acetic acid, 4-methyl-4 pentenoic acid, maleic acid, maleic anhydride, 1,2,3,6-tetrahydrophthalic anhydride, 3,6-epoxy-1,2,3,6-tetrahydrophthalic anhydride, 5-norbornene-2,3-dicarboxylic anhydride, bicycle[2,2,2]-5-octene-2,3-dicarboxylic anhydride, 3-methyl-1,2,6-tetrahydrophthalic anhydride, 2-methyl-1,3,6-tetrahydrophthalic anhydride, itaconic acid, mesaconic acid, methylenemalonic acid, fumaric acid, citraconic acid, 2-acrylamido-2-methylpropanesulfonic acid, 3-allyloxy-2-hydroxy propane sulfonic acid, allyl phosphonic acid, allyloxybenzenesulfonic acid, 2-hydroxy-3-(2-propenyloxy) propanesulfonic acid, allylsulfonic acid, other acrylamidomethyl propane sulfonic acids, methallyl sulfonic acid, isopro-phenylsulfonic acid, vinylphosphonic acid, styrenesulfonic acid, vinylsulfonic acid, aspartic acid, hydroxamic acid, adipic acid, and the alkali metal or ammonium salts thereof; methyl acrylate, ethyl acrylate, butyl acrylate, n-hexyl acrylate, methyl methacrylate, ethyl methacrylate, butyl methacrylate, isobutyl methacrylate, t-butylaminoethyl methacrylate, diethylaminoethyl acrylate, hydroxyethyl methacrylate, hydroxyethyl acrylate, hydroxypropyl acrylate, hydroxypropyl methacrylate, diethylaminoethyl methacrylate, dimethylaminoethyl methacrylate, dimethylaminoethyl acrylate, tertiary butylacrylate, polyethyleneglycol monomethacrylate, phosphoethyl methacrylate, and vinyl acetate; acrylamide (or 2-propenamide), methacrylamide, ethyl acrylamide, propyl acrylamide, N-t-butylacrylamide, tertiary butyl methacrylamide, tertiary octyl acrylamide, N-methylacrylamide, N,N-dimethylacrylamide (or N, N-dimethyl-2-propenamide), dimethylaminopropyl methacrylamide, cyclohexyl acrylamide, benzyl methacrylamide, vinyl acetamide, sulfomethylacrylamide, sulfoethylacrylamide, 2-hydroxy-3-sulfopropyl acrylamide, sulfophenylacrylamide, N-vinyl formamide, N-vinyl acetamide, 2-hydroxy-3-sulfopropyl acrylamide, N-vinyl pyrrolidone (a cyclic amide), 2-vinylpyridene, 4-vinylpyridenem and carboxymethylacrylamide; maleic anhydride (or 2, 5-furandione) and succinic anhydride; acrylonitrile and methacrylonitrile; acrylamidopropyltrimethylammonium chloride, diallyldimethylammonium chloride, and methacrylamidopropyltrimethylammonium chloride; 1,2-dihydroxy-3-butene, allyl alcohol, ethylene glycoldiacrylate, 2-ethyl-oxazoline, diethylenetriamine, ethylene oxide, propylene oxide, ammonia, styrene, ethylene diamine, dimethylamine, diallyl phthalate, polyethylene glycol monomethacrylate, sodium styrene sulfonate, an alkoxylated allyl alcohol sulfonate or mixtures thereof.

In another embodiment, an alkoxylated allyl alcohol sulfonate includes the following structure:

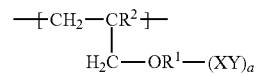

wherein $R^1$ is a hydroxyl substituted alkyl or alkylene radical having 1 to about 10 carbon atoms, or a non-substituted alkyl or alkylene radical having 1 to about 10 carbon atoms, or is $-(CH_2-CH_2-O)_n-$, $-[CH_2-CH(CH_3)-O]_n-$, or a mixture of both, wherein n is an integer from about 1 to about 50; wherein $R^2$ is H or a lower alkyl (C1-C3) group; wherein X, when present, is an anionic radical selected from the group consisting of $-SO_3$, $-PO_3$, $-PO_4$, and $-COO$; wherein Y, when present, is H or any water soluble cation or cations which together counterbalance the valance of the anionic radical; and wherein a is 0 or 1.

A water soluble polyelectrolyte polymer suitable for use in a heat transfer fluid super concentrate may, in one embodiment, have a molecular weight (MW) of about 200 to about 2,000,000 Daltons. In another embodiment, a suitable water soluble polyelectrolyte polymer dispersant has a molecular weight (MW) from about 500 to about 20,000 Daltons.

A non-limiting example of a water soluble polyelectrolyte polymer suitable for use in a heat transfer fluid super concentrate includes polycarboxylates such as (1) polyacrylic acids or polyacrylates, acrylate based polymers, copolymers, terpolymers, and quadpolymers such as acrylate/acrylamide copolymers, acrylate/AMPS (acrylamido methylene sulfonic acid or 2-acrylamido-2-methyl-1-propanesulfonic acid) or acrylamidoalkane sulfonic acid copolymers, acrylate/sulfonate copolymers, acrylate/hydroxyalkyl acrylate copolymers, acrylate/alkyl acrylate copolymers, acrylate/AMPS/alkyl acrylamide terpolymers, acrylate/acrylamidoalkane sulfonic acid/styrene sulfonic acid (or water soluble salts) terpolymers, acrylate/acrylamide/ sulfoalkylacrylamide terpolymers, acrylic acid/allyloxy-2-hydroxypropylsulfonic acid(AHPSE)/polyethyleneglycol allyl ether terpolymer, acrylate/methacrylate methyl ester/2-propane-1-sulfonic acid, 2-methyl-, sodium salt/bezenesulfonic acid, 4-[(2-methyl-2-propenyl)oxy]-, sodium salt quadpolymers; (2) polymethacrylic acids or polymethacrylates, methacrylate based polymers, copolymers, terpolymers, and quadpolymers, where one monomer of the corresponding acrylate based polymers listed in (1) is replaced by methacrylate or methacrylic acid; (3) polymaleic acid or maleic anhydride polymers, maleic acid based polymers, their copolymers, terpolymers and quadpolymers, where one monomer of the corresponding acrylate based polymers listed in (1) is replaced by maleic acid or maleic anhydride; (4) polyacrylamides, modified acrylamide based polymers, and acrylamide based copolymers, terpolymers and quadpolymers, where one monomer of the corresponding acrylate based polymers listed in (1) is replaced by acrylamide; (5) sulfonic acid based copolymers, terpolymers and quadpolymers or their water soluble salts; phosphonic acid based copolymers, terpolymers and quadpolymers or their water soluble salts; phosphinic acid based copolymers, terpolymers and quadpolymers or their water soluble salts; (6) vinylpyrrolidone based homopolymers, and copolymers; (7) alkylene oxide based copolymers and terpolymers; and combinations comprising one or more of the foregoing.

A water soluble polymer may also be a polyether polyamino methylene phosphonate, a phosphino polyacrylate acid, or a polyvinylpyrrolidone.

Specific examples of commercially available polymers suitable for use as a water soluble polyelectrolyte polymer in the heat transfer fluid super concentrate include polymers supplied by Noveon (or Lubrizol), polymers supplied by AkzoNobel, and polymers supplied by Dow (Rohm & Haas).

Polymers supplied by Noveon (or Lubrizol) that may be used as a water soluble polyelectrolyte polymer in the heat transfer fluid super concentrate include those shown in Table 1 below.

TABLE 1

Polymers supplied by Noveon (or Lubrizol): Good-Rite ® K-700 series polymers.

| Good-Rite ® Polymer Technical Data Sheet | Chemical Type | Nominal Molecular Weight | pH | Total Solids | Active Solids |
|---|---|---|---|---|---|
| K-702 | PAA | 240,000 | 2.5 | 25% | 24.70% |
| K-7028 | PAA | 2,000 | 3.6 | 55% | 51.70% |
| K-7058 | PAA | 5,000 | 2.5 | 50% | 49.20% |
| K-7058N | NaPAA | 5,000 | 7 | 45% | 35.70% |
| K-7058D | NaPAA | 5,000 | 7.5* | 100%** | 70% |
| K-7600N | NaPAA | 60,000 | 8.2 | 33% | 25.70% |
| K-732 | PAA | 5,000 | 2.6 | 50% | 49.50% |
| K-739 | NaPAA | 5,000 | 7.5* | 100%** | 70.10% |
| K-752 | PAA | 2,000 | 2.6 | 63% | 62.20% |
| K-759 | NaPAA | 2,000 | 7.5* | 100%** | 71.50% |
| K-765 | NaPMAA | 30,000 | 7 | 30% | 24.30% |
| K-766 | NaPMAA | 5,000 | 7 | 40% | 30.10% |
| K-776 | AA/SA | N.P. | 4.8 | 37% | 30.60% |
| K-775 | AA/SA | N.P. | 3.5 | 50% | 48% |
| K-781 | AA/SA/SS | N.P. | 2.8 | 55% | 52.80% |
| K-797 | AA/SA/SS | N.P. | 2.7 | 50% | 48.50% |
| K-797D | Na(AA/SA/SS) | N.P. | 8.2* | 100%** | 74.30% |
| K-798 | AA/SA/SS | N.P. | 2.8 | 50% | 48% |
| K-XP212 | Proprietary | N.P. | 4 | 40% | 39.20% |

PAA = Polyacrylate,
NaPAA = Sodium Polyacrylate,
NaPMAA = Sodium Polymethacrylate
AA = Acrylic Acid,
SA = Sulfonic Acid or AMPS,
SS = Sodium Styrene Sulfonate
'Active Solids' = 'Total Solids' − 'Counter Ions' (sodium) from post polymerization neutralization with NaOH
*pH of a 1% solution
**Includes moisture content
N.P. Not published Polymers supplied by AkzoNobel that may be used as a water soluble polyelectrolyte polymer in the heat transfer fluid super concentrate include those shown in Table 2 below.

TABLE 2

AkzoNobel Aquatreat Industrial Water Treatment Products Typical Property.

| Product | Total Solids | pH | Mw |
|---|---|---|---|
| Polyacrylic Acid | | | |
| AR-4 | 25 | 2.1 | 60000 |
| AR-6 | 25 | 2.3 | 100000 |
| AR-260 | 50 | 3.2 | 2000 |
| AR-602A | 50 | 2.8 | 4500 |
| AR-900A[1] | 50 | 2.9 | 2600 |
| AR-921A | 50 | 2.6 | 3000 |
| AR-935 | 35 | 3.5 | 2500 |
| Sodium Polyacrylate | | | |
| AR-602N[1] | 45 | 7.5 | 4500 |
| AR-636 | 45 | 7.5 | 5000 |
| AR-900[1] | 33 | 5.5 | 2600 |
| AR-940[1] | 40 | 8.3 | 2600 |
| Sodium Polymethacrylate | | | |
| AR-231[1] | 30 | 8.5 | 6500 |
| AR-232[1] | 30 | 8.5 | 9500 |
| AR-241 | 40 | 7 | 6500 |
| Copolymer | | | |
| AR-335 | 49 | 7.2 | 3400 |
| AR-540[1] | 44 | 4.3 | 10000 |
| AR-545 | 44 | 4.4 | 5000 |
| AR-546 | 37 | 4.8 | 9900 min |
| AR-978 | 42 | 5 | 4500 |
| AR-980[1] | 41 | 6.4 | 2800 |
| Sulfonated Styrene Maleic Anhydride | | | |
| VERSA-TL 3 | 95 | 7 | 20000 |
| VERSA-TL 4 | 25 | 7 | 20000 |

AR-335 is polyacrylamide; AR-545 and AR-546 are AA/AMPS copolymers; Aquatreat AR-540 is an Acrylic acid (AA)/2-propenoic acid, 2-methyl, methyl ester/benzenesulfonic acid, 4-[(2-methyl-2-propenyl)oxy]-, sodium salt/2-propene-1-sulfonic acid, 2-methyl-, sodium salt terpolymer. Versa TL-4=sulfonated styrene/maleic anhydride copolymer. Versa TL-3 is the dry form of Versa TL-4. AR-978 is acrylic acid/maleic acid copolymer. AR-980 is an acrylic acid/maleic acid/Nonionic monomer terpolymer.

Polymers supplied by Dow (Rohm & Haas) that may be used as a water soluble polyelectrolyte polymer in the heat transfer fluid super concentrate include those shown in Table 3 below.

TABLE 3

Polymers available from Dow (Rohm & Haas).

| Product Name | Chemical Nature | Molecular Weight | % Solids | pH |
|---|---|---|---|---|
| Polyacrylates | | | | |
| Acumer ®1000/ Optidose ™ 1000 | Polyacrylic acid and its Na salts | 2,000 | 47-49 | 3.2-4.0 |
| Acumer 1020 | Polyacrylic acid | 2,000 | 39-41 | 2.1-2.5 |
| Acumer 1100 | Polyacrylic acid and its Na salts | 4,500 | 47-49 | 3.2-4.0 |
| Acumer 1110 | Polyacrylic acid and its Na salts | 4,500 | 44-46 | 6.7 |
| Acumer 1050 | Polyacrylic acid and its Na salts | 2,000-2,300 | 47-49 | 3.2-4.0 |
| Acumer 1510 | Na Salt of Polycarboxylate | 60,000 | 24-26 | 2 |
| Acumer 1808 | Na Salt of Polycarboxylate | 30,000 | 21-22 | 3.5-5.0 |
| Acumer 1850 | Na Salt of Polycarboxylate | 30,000 | 29-31 | 9.0-10.8 |
| Acumer 2000/ Optidose 2000 | Modified Polycarboxylate | 4,500 | 42.5-43.5 | 3.8-4.6 |
| Acumer 2100 | Copolymer | 11,000 | 36.5-37.5 | 4.3-5.3 |
| Acumer 3100/ Optidose 3100 | Carboxylate/Sulfonate/Nonionic Terpolymer | 4,500 | 43-44 | 2.1-2.6 |
| Acumer 4161 | Phosphinopolycarboxylic Acid | 3,300-3,900 | 46-48 | 3.0-3.5 |
| Optidose 4210 | Polymaleic Acid | 500-1,000 | 50 | 1.0-2.0 |
| Acumer 5000 | Proprietary Polymer | 5,000 | 44.5-45.5 | 2.1-2.6 |
| Tamol ®650 | Na Salt of Polycarboxylate | 30,000 | 29-31 | 9.0-10.8 |
| Tamol 731A | Maleic Anhydride Na Salt Copolymer | 15,000 | 24-26 | 9.5-10.5 |
| Tamol 960 | Na Salt of Polycarboxylate | 5,000 | 39-41 | 8-9 |

Note:
Acumer 2000 and 2100 are carboxylic acid/sulfonic acid copolymers, i.e., AA/AMPS copolymers; Acumer 3100 and Acumer 5000 are acrylic acid/t-butyl acrylamide/2-acrylamido-2-methyl propane sulfonic acid terpolymers. Optidose 1000, 2000 and Optidose 3100 are tagged versions of Acumer 1000, 2000, and 3100, respectively.

In some embodiments, a water soluble polymer suitable for use in a heat transfer fluid super concentrate may be selected from polymers such as the ones available from (1) BASF under the Sokalan® and Tamol® brands, e.g., Sokalan® CP 9 (maleic acid based polymer), Sokalan® CP 10, 10S, 12S (all are acrylate based polymers), 13S, Sokalan® HP 22 G, HP 25, HP 59 and HP165 (polyvinylpyrrolidone), Sokalan® PA 15, PA 20, PA 25 Cl, PA 30 Cl, PA 40, Sokalan® PM 10 I, PM 70, Tamol® VS, and other similar products; (2) Cytec under the Cyanamer® brand, e.g., P-35, P-70, P-80, A-100L and A-15 (all are acrylate or acrylamide based polymers or copolymers) and the like; (3) Biolab additives under the Belclene® and Belsperse® brands, e.g., Belclene® 200 (maleic acid homopolymer), 283 (maleic acid terpolymer), 400 (sulfonated phosphino polycarboxylic acid) and 499 (sulfonated phosphono polycarboxylic acid); and Belsperse® 161 (phosphino polycarboxylic acid) and 164 (phosphino polycarboxylic acid) and the like and (4) Water soluble polymeric products from Ecolab/Nalco (e.g., acrylic acid/2-acrylamido-2-methylpropyl sulfonic acid copolymers, polyether polyamino phosphonate as described in U.S. Pat. No. 5,338,477, and acrylic acid/acrylamide/acrylamidomethanesulfonic acid terpolymers), GE Betz (e.g., acrylic acid/polyethyleneglycol allyl ether copolymers, acrylic acid/allyloxy-2-hydroxypropylsulfonic acid (or AHPSE)/polyethyleneglycol allyl ether terpolymers, and acrylic acid/AHPSE copolymers), Danaher/Chemtreat [e.g., allyoxybenzenesulfonic acid (~3.5 mole %)/methallyl sulfonic acid (~2.5 mole %)/methyl methacrylate (13-18 mole %)/acrylic acid (76-81 mole %) quadpolymers], Ciba, SNF Floerger, Rhone-Poulenc, Stockhausen, Hercules, Henkel, Allied Colloids, Hoechst Celanese, Ashland Chemical Company, Kurita Water Industries Ltd, Nippon Shokubai Co., and other suppliers.

In some embodiments, a super concentrate additive includes one or more water soluble calcium compounds that can generate calcium ions. Calcium ions can be derived from a calcium compound that produces calcium ions upon dissolving in a water containing solution at room temperature. Non-limiting examples of calcium compounds include an inorganic calcium compound such as calcium hydroxide, calcium molybdate, calcium vanadate, calcium tungstate, calcium perchlorate, calcium chloride, or hydrates of these salts, or a combination thereof. In another embodiment, a calcium compound includes calcium salt formed between calcium ions and an organic acid containing one or more carboxylic acid groups, such as calcium acetate, calcium formate, calcium propionate, calcium polymaleate, calcium polyacrylate, calcium lactate, calcium gluconate, calcium glycolate, calcium glucoheptonate, calcium citrate, calcium tartrate, calcium glucarate, calcium succinate, calcium hydroxysuccinate, calcium adipate, calcium oxalate, calcium malonate, calcium sulfamate, or hydrates of these calcium salts, or a combination thereof. A calcium compound can also be calcium salt formed between calcium ions and a phosphonate or a phosphinate, such as calcium-PBTC (where PBTC is 2-phosphonobutane-1,2,4-tricarboxylic acid) salts, calcium-HEDP (where HEDP is 1-hydroxyethane-1,1-diphosphonic acid, CAS no. 2809-21-4) salts, calcium-HPA (where HPA is hydroxyphosphono-acetic acid or 2-hydroxy phosphono acetic acid) salts, calcium phosphonosuccinic acid salts, calcium-PSO (where PSO is mono, bis and oligomeric phosphinosuccinic acid adduct mixtures described in U.S. Pat. No. 6,572,789 B1) salts or a combination thereof. Calcium compounds can be soluble in a heat transfer fluid super concentrate. As used herein, "soluble" refers to dissolving such that no particulate matter is visible to the naked eye.

Calcium ion concentration in a heat transfer fluid super concentrate additive can be about 0.1 mg/L to about 20,000 mg/L as $Ca^{2+}$. In another embodiment, calcium ion concentration in a heat transfer fluid super concentrate can be about 50 mg/L to about 12000 mg/L as $Ca^{2+}$. In another embodiment, calcium ion concentration can be about 60 mg/L to about 8000 mg/L as $Ca^{2+}$.

In some embodiments, a super concentrate additive includes one or more water soluble magnesium compounds that can generate magnesium ions. Magnesium ions can be derived from a magnesium compound that can produce magnesium ions upon dissolving in a water containing solution at room temperature. Magnesium compounds suitable for use include an inorganic magnesium compound such as magnesium molybdate, magnesium hydroxide, magnesium tungstate, magnesium sulfate, magnesium perchlorate, magnesium chloride, hydrates of these salts, or a combination thereof. A magnesium compound can also be a magnesium salt formed between magnesium ions and an organic acid containing one or more carboxylic acid groups, or one or more phosphonic acid groups, or one or more phosphinic acid groups, or a combination of these functional groups, such as magnesium formate, magnesium acetate, magnesium propionate, magnesium polyacrylate, magnesium polymaleate, magnesium lactate, magnesium gluconate, magnesium glycolate, magnesium glucoheptonate, magnesium citrate, magnesium tartrate, magnesium glucarate, magnesium succinate, magnesium hydroxysuccinate, magnesium adipate, magnesium oxalate, magnesium malonate, magnesium sulfamate, magnesium-PBTC (where PBTC is 2-phosphonobutane-1,2,4-tricarboxylic acid) salts, magnesium-HEDP (where HEDP is 1-hydroxyethane-1,1-diphosphonic acid) salts, magnesium-HPA (where HPA is hydroxyphosphono-acetic acid or 2-hydroxy phosphono acetic acid) salts, magnesium phosphonosuccinic acid salts, magnesium-PSO (where PSO is mono, bis and oligomeric phosphinosuccinic acid adduct mixtures) salts, or hydrates of these salts, or a combination thereof.

A magnesium ion concentration in a heat transfer fluid super concentrate additive can be about 0.1 mg/L to about 15000 mg/L as $Mg^{2+}$. In another embodiment, the magnesium ion concentration can be about 25 mg/L to about 12000 mg/L as $Mg^{2+}$. In another embodiment, the magnesium ion concentration can be about 50 mg/L to about 10000 mg/L as $Mg^{2+}$.

In some embodiments, a heat transfer fluid super concentrate additive can optionally include lithium ions. Lithium ions can be derived from a lithium compound that can produce lithium ions upon dissolving in a water containing solution at room temperature. A lithium compound can be an inorganic lithium compound such as lithium hydroxide, lithium phosphate, lithium borate, lithium perchlorate, lithium sulfate, lithium molybdate, lithium vanadate, lithium tungstate, lithium carbonate or a combination thereof. A lithium compound can also be lithium salt formed between lithium ions and an organic acid containing one or more carboxylic acid groups, or one or more phosphonic acid groups, or one or more phosphinic acid groups, or a combination of these functional groups, such as lithium acetate, lithium benzoate, lithium polyacrylate, lithium polymaleate, lithium lactate, lithium citrate, lithium tartrate, lithium gluconate, lithium glucoheptonate, lithium glycolate, lithium glucarate, lithium succinate, lithium hydroxyl succinate, lithium adipate, lithium sebacate, lithium benzoate, lithium phthalate, lithium salicylate, lithium valerate, lithium oleate, lithium laurate, lithium stearate, lithium oxalate, lithium malonate, lithium sulfamate, lithium formate, lithium propionate, lithium-PBTC (where PBTC is 2-phosphonobutane-1,2,4-tricarboxylic acid) salts, lithium-HEDP (where HEDP is 1-hydroxyethane-1,1-diphosphonic acid) salts, lithium-HPA (where HPA is hydroxyphosphono-acetic acid or 2-hydroxy phosphono acetic acid) salts, lithium phosphonosuccinic acid salts, lithium-PSO (where PSO is mono, bis and oligomeric phosphinosuccinic acid adduct mixtures) salts, or hydrates of these salts, or a combination of the foregoing lithium compounds.

A lithium compound can be present in an amount such that a heat transfer fluid super concentrate additive has a lithium ion concentration of 5 to 300,000 parts per million by weight (ppm). Within this range, a lithium ion concentration can be less than 200,000 ppm or more specifically, less than or equal to 100,000 ppm. Also within this range, a lithium ion concentration can be greater than or equal to 100 ppm, or more specifically, greater than or equal to 200 ppm.

In some embodiments, a heat transfer super concentrate additive can optionally include strontium ions. Strontium ions can be derived from a strontium compound that can produce strontium ions upon dissolving in a water containing solution at room temperature. A strontium compound can be an inorganic strontium compound such as strontium hydroxide, strontium chloride, strontium perchlorate, strontium nitrate, strontium iodide, strontium sulfate, strontium borate, strontium phosphate, strontium dihydrogen phosphate, strontium molybdate, strontium tungstate, strontium titanate, hydrates of these salts, or a combination thereof. A strontium compound can also be a strontium salt formed between a strontium ion and an organic acid containing one or more carboxylic acid groups, or one or more phosphonic acid groups, or one or more phosphinic acid groups, or a combination of these functional groups, such as strontium formate, strontium acetate, strontium propionate, strontium butyrate, strontium polyacrylate, strontium lactate, strontium polymaleate, strontium gluconate, strontium glycolate, strontium glucoheptonate, strontium citrate, strontium tartrate, strontium glucarate, strontium succinate, strontium hydroxysuccinate, strontium adipate, strontium oxalate, strontium malonate, strontium sulfamate, strontium sebacate, strontium benzoate, strontium phthalate, strontium salicylate, strontium-PBTC (where PBTC is 2-phosphonobutane-1,2,4-tricarboxylic acid) salts, strontium-HEDP (where HEDP is 1-hydroxyethane-1,1-diphosphonic acid) salts, strontium-HPA (where HPA is hydroxyphosphono-acetic acid or 2-hydroxy phosphono acetic acid) salts, strontium phosphonosuccinic acid salts, strontium-PSO (where PSO is mono, bis and oligomeric phosphinosuccinic acid adduct mixtures) salts, or hydrates of these salts, or a combination of the foregoing strontium compounds.

A strontium compound can be present in an amount such that a heat transfer fluid super concentrate additive has a strontium ion concentration of 0 to 20000 mg/L as $Sr^{2+}$. Within this range, a strontium ion concentration can be less than 12000 mg/L as $Sr^{2+}$.

In some embodiments, a heat transfer fluid super concentrate additive can contain at least one or more selecting from the following components: (1) water soluble calcium compounds that can produce calcium ions upon dissolving in a water containing solution at room temperature; (2) water soluble magnesium compounds that can produce magnesium ions upon dissolving in a water containing solution at room temperature; and (3) water soluble compounds that can produce lithium ions upon dissolving in a water containing solution at room temperature. Examples of calcium compounds, magnesium compounds, and lithium compounds suitable for use are disclosed herein. Total concentrations of the calcium ions, magnesium ions and lithium ions derived from the water soluble compounds can be between 5 to 350,000 parts per million (ppm) by weight of the heat transfer fluid super concentrate.

In some embodiments, a heat transfer fluid super concentrate additive can optionally include molybdate ions. Molybdate ions can be derived from a salt of molybdic acid which is soluble in water. Molybdate compounds include both alkali metal and alkali earth metal molybdates and mixtures thereof. Examples of molybdates are sodium molybdate, potassium molybdate, and lithium molybdate. In addition, hydrates of alkali metal and alkali earth metal molybdates such as sodium molybdate di-hydrate are also suitable for use in the disclosed super concentrate additive. In some embodiments, concentration of molybdate ions is below about 20 parts by weight per 100 parts by weight of a heat transfer fluid super concentrate. In another embodiment, concentration of molybdate ions is below 15% by weight. In another embodiment, concentration of molybdate ions is below about 7.5% by weight.

The pH of a super concentrate additive can be less than about 5.5. In some embodiments, the pH of a super concentrate additive is less than about 4.5. In yet another embodiment, the pH of the additive can be less than about 4.0. In a further embodiment, the pH of a super concentrate can be less than about 2.0. In a further embodiment, the pH is less than zero (i.e., a negative value).

It is within the scope of the present disclosure to select a pH of the super concentrate additive solution to be less than or equal to one of the following values: about 0.001, 0.01, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, and 6.9. It is likewise within the scope of the present disclosure for the pH of the super concentrate additive solution to fall within one of many different ranges. In a first set of ranges, the pH of the super concentrate additive solution is one of the following ranges: about 0.001 to 6.9, 0.01 to 6.9, 0.1 to 6.9, 0.2 to 6.9, 0.3 to 6.9, 0.4 to 6.9, 0.5 to 6.9, 0.6 to 6.9, 0.7 to 6.9, 0.8 to 6.9, 0.9 to 6.9, 1.0 to 6.9, 1.1 to 6.9, 1.2 to 6.9, 1.3 to 6.9, 1.4 to 6.9, 1.5 to 6.9, 1.6 to 6.9, 1.7 to 6.9, 1.8 to 6.9, 1.9 to 6.9, 2.0 to 6.9, 2.1 to 6.9, 2.2 to 6.9, 2.3 to 6.9, 2.4 to 6.9, 2.5 to 6.9, 2.6 to 6.9, 2.7 to 6.9, 2.8 to 6.9, 2.9 to 6.9, 3.0 to 6.9, 3.1 to 6.9, 3.2 to 6.9, 3.3 to 6.9, 3.4 to 6.9, 3.5 to 6.9, 3.6 to 6.9, 3.7 to 6.9, 3.8 to 6.9, 3.9 to 6.9, 4.0 to 6.9, 4.1 to 6.9, 4.2 to 6.9, 4.3 to 6.9, 4.4 to 6.9, 4.5 to 6.9, 4.6 to 6.9, 4.7 to 6.9, 4.8 to 6.9, 4.9 to 6.9, 5.0 to 6.9, 5.1 to 6.9, 5.2 to 6.9, 5.3 to 6.9, 5.4 to 6.9, or 5.5 to 6.9. In a second set of ranges, the pH of the super concentrate additive solution is one of the following ranges: about 0.001 to 5.6, 0.01 to 5.6, 0.1 to 5.6, 0.2 to 5.6, 0.3 to 5.6, 0.4 to 5.6, 0.5 to 5.6, 0.6 to 5.6, 0.7 to 5.6, 0.8 to 5.6, 0.9 to 5.6, 1.0 to 5.6, 1.1 to 5.6, 1.2 to 5.6, 1.3 to 5.6, 1.4 to 5.6, 1.5 to 5.6, 1.6 to 5.6, 1.7 to 5.6, 1.8 to 5.6, 1.9 to 5.6, 2.0 to 5.6, 2.1 to 5.6, 2.2 to 5.6, 2.3 to 5.6, 2.4 to 5.6, 2.5 to 5.6, 2.6 to 5.6, 2.7 to 5.6, 2.8 to 5.6, 2.9 to 5.6, 3.0 to 5.6, 3.1 to 5.6, 3.2 to 5.6, 3.3 to 5.6, 3.4 to 5.6, 3.5 to 5.6, 3.6 to 5.6, 3.7 to 5.6, 3.8 to 5.6, 3.9 to 5.6, 4.0 to 5.6, 4.1 to 5.6, 4.2 to 5.6, 4.3 to 5.6, 4.4 to 5.6, 4.5 to 5.6, 4.6 to 5.6, 4.7 to 5.6, 4.8 to 5.6, 4.9 to 5.6, 5.0 to 5.6, 5.1 to 5.6, 5.2 to 5.6, 5.3 to 5.6, or 5.4 to 5.6. In a third set of ranges, the pH of the super concentrate additive solution is one of the following ranges: about 0.001 to 4.5, 0.01 to 4.5, 0.1 to 4.5, 0.2 to 4.5, 0.3 to 4.5, 0.4 to 4.5, 0.5 to 4.5, 0.6 to 4.5, 0.7 to 4.5, 0.8 to 4.5, 0.9 to 4.5, 1.0 to 4.5, 1.1 to 4.5, 1.2 to 4.5, 1.3 to 4.5, 1.4 to 4.5, 1.5 to 4.5, 1.6 to 4.5, 1.7 to 4.5, 1.8 to 4.5, 1.9 to 4.5, 2.0 to 4.5, 2.1 to 4.5, 2.2 to 4.5, 2.3 to 4.5, 2.4 to 4.5, 2.5 to 4.5, 2.6 to 4.5, 2.7 to 4.5, 2.8 to 4.5, 2.9 to 4.5, 3.0 to 4.5, 3.1 to 4.5, 3.2 to 4.5, 3.3 to 4.5, 3.4 to 4.5, 3.5 to 4.5, 3.6 to 4.5, 3.7 to 4.5, 3.8 to 4.5, 3.9 to 4.5, 4.0 to 4.5, 4.1 to 4.5, 4.2 to 4.5, 4.3 to 4.5, or 4.4 to 4.5.

A heat transfer fluid super concentrate additive can be a single phase homogeneous solution at room temperature. An embodiment of the concentrate is storage stable at a temperature between about −10° C. and 60° C. When the super concentrate additive is blended with a heat transfer fluid concentrate, the mixture can meet properties and performance requirements of ASTM D3306.

Super concentrate additive solutions in accordance with the present teachings may exhibit surprisingly and unexpectedly good storage stability (e.g., as determined visually by the substantial absence of precipitate present in solution) under a variety of different storage conditions. For example, it is within the scope of the present disclosure for a super concentrate additive solution in accordance with the present teachings to be substantially free of precipitate after storage at room temperature—in some embodiments, after storage at 100° C., in some embodiments after storage at 140° C., and in some embodiments after storage at a combination of room temperature, 100° C., and/or 140° F.—for a period of time corresponding to at least one of the following values (i.e., a period of time greater than or equal to one of the following values): about 1 day, 2 days, 3 days, 4 days, 5 days, 6 days, 7 days (one week), 8 days, 9 days, 10 days, 11 days, 12 days, 13 days, 14 days (two weeks), 15 days, 16 days, 17 days, 18 days, 19 days, 20 days, 21 days (three weeks), 22 days, 23 days, 24 days, 25 days, 26 days, 27 days, 28 days, 29 days, 30 days (one month), 31 days, 32 days, 33 days, 34 days, 35 days, 36 days, 37 days, 38 days, 39 days, 40 days, 41 days, 42 days, 43 days, 44 days, 45 days, 46 days, 47 days, 48 days, 49 days, 50 days, 51 days, 52 days, 53 days, 54 days, 55 days, 56 days, 57 days, 58 days, 59 days, 60 days (two months), 61 days, 62 days, 63 days, 64 days, 65 days, 66 days, 67 days, 68 days, 69 days, 70 days, 71 days, 72 days, 73 days, 74 days, 75 days, 76 days, 77 days, 78 days, 79 days, 80 days, 81 days, 82 days, 83 days, 84 days, 85 days, 86 days, 87 days, 88 days, 89 days, 90 days (three months), 91 days, 92 days, 93 days, 94 days, 95 days, 96 days, 97 days, 98 days, 99 days, 100 days, 101 days, 102 days, 103 days, 104 days, 105 days, 106 days, 107 days, 108 days, 109 days, 110 days, 111 days, 112 days, 113 days, 114 days, 115 days, 116 days, 117 days, 118 days, 119 days, 120 days (four months), 121 days, 122 days, 123 days, 124 days, 125 days, 126 days, 127 days, 128 days, 129 days, 130 days, 131 days, 132 days, 133 days, 134 days, 135 days, 136 days, 137 days, 138 days, 139 days, 140 days, 141 days, 142 days, 143 days, 144 days, 145 days, 146 days, 147 days, 148 days, 149 days, 150 days (five months), 151 days, 152 days, 153 days, 154 days, 155 days, 156 days, 157 days, 158 days, 159 days, 160 days, 161 days, 162 days, 163 days, 164 days, 165 days, 166 days, 167 days, 168 days, 169 days, 170 days, 171 days, 172 days, 173 days, 174 days, 175 days, 176 days, 177 days, 178 days, 179 days, 180 days (six months), 181 days, 182 days, 183 days, 184 days, 185 days, 186 days, 187 days, 188 days, 189 days, 190 days, 191 days, 192 days, 193 days, 194 days, 195 days, 196 days, 197 days, 198 days, 199 days, 200 days, 201 days, 202 days, 203 days, 204 days, 205 days, 206 days, 207 days, 208 days, 209 days, or 210 days (seven months).

It is also within the scope of the present disclosure for the minimum amount of time that a super concentrate additive solution in accordance with the present teachings remains substantially free of precipitate after storage at room temperature—in some embodiments, after storage at 100° C., in some embodiments after storage at 140° C., and in some embodiments after storage at a combination of room temperature, 100° C., and/or 140° F.—to fall within one of many different ranges. In a first set of ranges, the amount of time is in one of the following ranges: about 12 days to 210 days, 13 days to 210 days, 14 days to 210 days, 15 days to 210 days, 16 days to 210 days, 17 days to 210 days, 18 days to 210 days, 19 days to 210 days, 20 days to 210 days, 21 days to 210 days, 22 days to 210 days, 23 days to 210 days, 24 days to 210 days, 25 days to 210 days, 26 days to 210 days, 27 days to 210 days, 28 days to 210 days, 29 days to 210 days, 30 days to 210 days, 31 days to 210 days, 32 days to 210 days, 33 days to 210 days, 34 days to 210 days, 35 days to 210 days, 36 days to 210 days, 37 days to 210 days, 38 days to 210 days, 39 days to 210 days, 40 days to 210 days, 41 days to 210 days, 42 days to 210 days, 43 days to 210 days, 44 days to 210 days, 45 days to 210 days, 46 days to 210 days, 47 days to 210 days, 48 days to 210 days, 49 days to 210 days, 50 days to 210 days, 51 days to 210 days, 52 days to 210 days, 53 days to 210 days, 54 days to 210 days, 55 days to 210 days, 56 days to 210 days, 57 days to 210 days, 58 days to 210 days, 59 days to 210 days, 60 days to 210 days, 61 days to 210 days, 62 days to 210 days, 63 days to 210 days, 64 days to 210 days, 65 days to 210 days, 66 days to 210 days, 67 days to 210 days, 68 days to 210 days, 69 days to 210 days, 70 days to 210 days, 71 days to 210 days, 72 days to 210 days, 73 days to 210 days, 74 days to 210 days, 75 days to 210 days, 76 days to 210 days, 77 days to 210 days, 78 days to 210 days, 79 days to 210 days, 80 days to 210 days, 81 days to 210 days, 82 days to 210 days, 83 days to 210 days, 84 days to 210 days, 85 days to 210 days, 86 days to 210 days, 87 days to 210 days, 88 days to 210 days, 89 days to 210 days, or 90 days to 210 days. In a second set of ranges, the amount of time is in one of the following ranges: about 7 days to 210 days, 7 days to 209 days, 7 days to 208 days, 7 days to 207 days, 7 days to 206 days, 7 days to 205 days, 7 days to 204 days, 7 days to 203 days, 7 days to 202 days, 7 days to 201 days, 7 days to 200 days, 7 days to 199 days, 7 days to 198 days, 7 days to 197 days, 7 days to 196 days, 7 days to 195 days, 7 days to 194 days, 7 days to 193 days, 7 days to 192 days, 7 days to 191 days, 7 days to 190 days, 7 days to 189 days, 7 days to 188 days, 7 days to 187 days, 7 days to 186 days, 7 days to 185 days, 7 days to 184 days, 7 days to 183 days, 7 days to 182 days, 7 days to 181 days, 7 days to 180 days, 7 days to 179 days, 7 days to 178 days, 7 days to 177 days, 7 days to 176 days, 7 days to 175 days, 7 days to 174 days, 7 days to 173 days, 7 days to 172 days, 7 days to 171 days, 7 days to 170 days, 7 days to 169 days, 7 days to 168 days, 7 days to 167 days, 7 days to 166 days, 7 days to 165 days, 7 days to 164 days, 7 days to 163 days, 7 days to 162 days, 7 days to 161 days, 7 days to 160 days, 7 days to 159 days, 7 days to 158 days, 7 days to 157 days, 7 days to 156 days, 7 days to 155 days, 7 days to 154 days, 7 days to 153 days, 7 days to 152 days, 7 days to 151 days, or 7 days to 150 days. In a third set of ranges, the amount of time is in one of the following ranges: about 30 days to 150 days, 31 days to 149 days, 32 days to 148 days, 33 days to 147 days, 34 days to 146 days, 35 days to 145 days, 36 days to 144 days, 37 days to 143 days, 38 days to 142 days, 39 days to 141 days, 40 days to 140 days, 41 days to 139 days, 42 days to 138 days, 43 days to 137 days, 44 days to 136 days, 45 days to 135 days, 46 days to 134 days, 47 days to 133 days, 48 days to 132 days, 49 days to 131 days, 50 days to 130 days, 51 days to 129 days, 52 days to 128 days, 53 days to 127 days, 54 days to 126 days, 55 days to 125 days, 56 days to 124 days, 57 days to 123 days, 58 days to 122 days, 59 days to 121 days, 60 days to 120 days, 61 days to 119 days, 62 days to 118 days, 63 days to 117 days, 64 days to 116 days, 65 days to 115 days, 66 days to 114 days, 67 days to 113 days, 68 days to 112 days, 69 days to 111 days, 70 days to 110 days, 71 days to 109 days, 72 days to 108 days, 73 days to 107 days, 74 days to 106 days, 75 days to 105 days, 76 days to 104 days, 77 days to 103 days, 78 days to 102 days, 79 days to 101 days, 80 days to 100 days, 81 days to 99 days, 82 days to 98 days, 83 days to 97 days, 84 days to 96 days, 85 days to 95 days, 86 days to 94 days, 87 days to 93 days, 88 days to 92 days, or 89 days to 91 days.

In some embodiments, a super concentrate additive solution also optionally includes components such as colorants, antifoams, pH adjusting agents (e.g., alkali or alkali earth metal bases such as NaOH, KOH, LiOH, Ca(OH)$_2$, Sr(OH)$_2$, etc.), water soluble inorganic phosphates, phosphonates, phosphinates, biocides, azole compounds and one or more $C_6$ to $C_{18}$ mono or dibasic aliphatic or aromatic carboxylic acids or salts thereof, and other coolant additives.

Illustrative examples of colorants or dyes suitable for use in a super concentrate additive solution include "Uranine Yellow", "Uranine Dye", "Alizarine Green", "Chromatint Orange 1735" or "Green AGS liquid" from Abbeys Color Inc., or Chromatech Incorporated, "Chromatint Yellow 0963 Liquid Dye", "Chromatint Yellow 2741 Liquid Dye", "Chromatint Green 1572 dye", "Chromatint Green 2384 Dye", "Chromatint Violet 1579 Dye" from Chromatech Incorporated, "Acid Red #52" or Sulforhodamine B from Tokyo Chemical Industry Co. or TCI America, "Orange II (acid Orange 7)" or "Intracid Rhodamine WT (Acid Red 388) from Sensient Technologies or other suppliers.

Exemplary antifoams or defoamers suitable for use in a super concentrate additive solution include antifoam agents "PM-5150" available from Prestone Products Corp., and "Pluronic® L-61" from BASF Corp. The optional antifoam agents may also include polydimethylsiloxane emulsion based antifoams. They include PC-5450NF from Performance Chemicals, LLC in Boscawen, N.H.; CNC antifoam XD-55 NF and XD-56 from CNC International in Woonsocket in RI. Generally, the optional antifoam agents may comprise a silicone, for example, SAG brand of silicone based antifoams from Momentive Performance Materials Inc. in Waterford, N.Y., Dow Corning and other suppliers; an ethylene oxide-propylene oxide (EO-PO) block copolymer and a propylene oxide-ethylene oxide-propylene oxide (PO-EO-PO) block copolymer (e.g., Pluronic® L61, Pluronic® L81, and other Pluronic® and Pluronic® C products); poly(ethylene oxide) or poly(propylene oxide), e.g., PPG 2000 (i.e., polypropylene oxide with an average molecular weight of 2000 Daltons); a polydiorganosiloxane based products (e.g., products containing polydimethylsiloxane (PDMS), and the like); a fatty acids or fatty acid esters (e.g., stearic acid, and the like); a fatty alcohol, an alkoxylated alcohol and a polyglycol; a polyether polyol acetate, a polyether ethoxylated sorbital hexaoleate, and a poly(ethylene oxide-propylene oxide)monoallyl ether acetate; a wax, a naphtha, kerosene and an aromatic oil; and combination comprising one or more of the foregoing antifoam agents.

Exemplary optional biocides suitable for use in a super concentrate additive solution include various non-oxidizing biocides such as glutaraldehyde, isothiazolin, 5-chloro-2-methyl-4-isothiazolin-3-one, 2-methyl-4-isothiazolin-3-one, 1,2-benzisothiazolin-3-one, 2,2-dibromo-3-nitrilopropionamide, 2-bromo-2-nitropropane-1,3-diol, methylene bis(thiocynate), terbuthylazine, and tetrakis(hydroxymethyl) phosphonium sulphate; and combination comprising one or more of the foregoing biocides.

Exemplary optional pH adjusting agents suitable for use in a super concentrate additive solution include alkali or alkaline earth metal hydroxides or oxides, such as sodium hydroxide, potassium hydroxide; and inorganic phosphates such as sodium phosphate, potassium phosphate, sodium pyrophosphate and potassium pyrophosphate or a mixture thereof.

Corrosion inhibitors for copper and copper alloys can also be optionally included as a corrosion inhibitor. Suitable copper and copper corrosion inhibitors include compounds containing a 5- or 6-member heterocyclic ring as an active functional group, wherein the heterocyclic ring contains at least one nitrogen atom, for example, an azole compound. Particularly, an azole compound can be benzotriazole, tolyltriazole, methyl benzotriazole (e.g., 4-methyl benzotriazole or 5-methyl benzotriazole), butyl benzotriazole, other alkyl benzotriazoles where the alkyl group contains from 2 to 20 carbon atoms, mercaptobenzothiazole, thiazole, substituted thiazoles, imidazole, benzimidazole, substituted imidazoles, indazole, substituted indazoles, tetrazole, substituted tetrazoles, tetrahydrobenzotriazoles, tetrahydrogenated benzotriazoles (e.g., 4,5,6,7-tetrahydrobenzotriazole), tetrahydrotolyltriazole, 4-methyl-1H-benzotriazole, 5-methyl-1H-benzotriazole, tetrahydrobenzotriazole, alkali metal salts of these azole compounds, and mixtures thereof can be used as Cu and Cu alloy corrosion inhibitors. The copper and copper alloy corrosion inhibitors can be present in a super concentrate additive solution in an amount of about 0.01 to 10% by weight.

Optionally, some non-ionic surfactants may also be included in a super concentrate additive solution. Such non-ionic surfactants include fatty acid esters, such as sorbitan fatty acid esters, polyalkylene glycols, polyalkylene glycol esters, copolymers of ethylene oxide (EO) and propylene oxide (PO), polyoxyalkylene derivatives of a sorbitan fatty acid ester, and mixtures thereof. The average molecular weight of the non-ionic surfactants would be between about 55 to about 300,000, more preferably from about 110 to about 10,000. Suitable sorbitan fatty acid esters include sorbitan monolaurate (e.g., sold under tradename Span® 20, Arlacel® 20, S-MAZ® 20M1), sorbitan monopalmitate (e.g., Span® 40 or Arlacel® 40), sorbitan monostearate (e.g., Span® 60, Arlacel® 60, or S-MAZ® 60K), sorbitan monooleate (e.g., Span® 80 or Arlacel® 80), sorbitan monosesquioleate (e.g., Span® 83 or Arlacel® 83), sorbitan trioleate (e.g., Span® 85 or Arlacel® 85), sorbitan tridtearate (e.g., S-MAZ® 65K), sorbitan monotallate (e.g., S-MAZ® 90). Suitable polyalkylene glycols include polyethylene glycols, polypropylene glycols, and mixtures thereof. Examples of polyethylene glycols suitable for use include CARBOWAX™ polyethylene glycols and methoxypolyethylene glycols from Dow Chemical Company, (e.g., CARBOWAX PEG 200, 300, 400, 600, 900, 1000, 1450, 3350, 4000 & 8000, etc.) or PLURACOL® polyethylene glycols from BASF Corp. (e.g., Pluracol® E 200, 300, 400, 600, 1000, 2000, 3350, 4000, 6000 and 8000, etc.). Suitable polyalkylene glycol esters include mono- and di-esters of various fatty acids, such as MAPEG® polyethylene glycol esters from BASF (e.g., MAPEG® 200ML or PEG 200 Monolaurate, MAPEG® 400 DO or PEG 400 Dioleate, MAPEG® 400 MO or PEG 400 Monooleate, and MAPEG® 600 DO or PEG 600 Dioleate, etc.). Suitable copolymers of ethylene oxide (EO) and propylene oxide (PO) include various Pluronic® and Pluronic® R block copolymer surfactants from BASF, DOWFAX non-ionic surfactants, UCON™ fluids and SYNALOX® lubricants from DOW Chemical. Suitable polyoxyalkylene derivatives of a sorbitan fatty acid ester include polyoxyethylene 20 sorbitan monolaurate (e.g., products sold under trademarks TWEEN® 20 or T-MAZ® 20), polyoxyethylene 4 sorbitan monolaurate (e.g., TWEEN® 21), polyoxyethylene 20 sorbitan monopalmitate (e.g., TWEEN® 40), polyoxyethylene 20 sorbitant monostearate (e.g., TWEEN® 60 or T-MAZ® 60K), polyoxyethylene 20 sorbitan monooleate (e.g., TWEEN® 80 or T-MAZ® 80), polyoxyethylene 20 tristearate (e.g., TWEEN® 65 or T-MAZ® 65K), polyoxyethylene 5 sorbitan monooleate (e.g., TWEEN® 81 or T-MAZ® 81), polyoxyethylene 20 sorbitan trioleate (e.g., TWEEN® 85 or T-MAZ® 85K) and the like.

The term "softened water" refers to water that meets the water quality requirements for use to prepare pre-dilute engine coolant solutions specified in section 4.6 of ASTM standard specification D3306-14.

The following examples and representative procedures illustrate features in accordance with the present teachings, and are provided solely by way of illustration. They are not intended to limit the scope of the appended claims or their equivalents.

EXAMPLES

Super concentrate additive compositions were used to produce organic acid technology (OAT) coolants of different formulations. The OAT coolants were subjected to NanoCorr coupled multi-electrode sensor testing. The NanoCorr testing yields both a localized corrosion rate (CR_max) and a surface area average corrosion rate (CR_avg) as a function of time (every 30 seconds).

Methods
Solutions

The base test solutions were prepared by mixing commercially available coolants with de-ionized water to yield a coolant concentration of either 25 vol. % or 50 vol. %. Alternatively, coolant concentrates prepared by mixing the super concentrates with ethylene glycol and other required or optional components such as antifoam and colorants, pH adjusting agents were also used to prepare the test solution after the addition of deionized water. Other components of the test solution were sodium chloride (ACS grade) and commercial products supplied by the producers.

Metal Plate Samples and Test Procedures

A piece of sand cast aluminum AA 319 (UNS A03190) cut from a 3.0-L engine block supplied by a major North America car manufacture was used as the working electrode in electrochemical tests. The test set-up specified in GM9066P was used to obtain the electrochemical test results for corrosion under heat rejection heat transfer conditions. A scan rate of 2 mV/sec. was used to obtain the anodic polarization curve measurement results shown in FIG. 5.

NanoCorr Coupled Multi-Electrode Sensors for Measuring Localized Corrosion

A Corr Instruments NanoCorr Coupled Multi-electrode Sensor (CMS) Analyzer with Con Visual Software, Version 2.2.3 was used to determine the localized corrosion rate of cast aluminum in the test solution. The CMS method is an electrochemical method capable of real-time monitoring of localized corrosion rates of metal in corrosive media. A 25-electrode sensor array probe supplied by Con Instruments was used. Each electrode of the probe was made of the same cast aluminum (SAE 329, UNS A23190) square wire having an exposed surface area of 1 mm2. The 25 wire electrodes sealed in Epoxy and spaced uniformly in a 1.2×1.2 cm matrix array were connected electrically. The coupled multi-electrode probe simulated the corrosion conditions of a conventional one-piece electrode surface having an exposed surface area of about 1.4 $cm^2$. A localized corrosion rate (CR_max) as a function of time was obtained from the probe by measuring the coupling current from each individual electrode in the probe and performing statistical analysis of the measured data. A sampling rate of 30 seconds per set of data was used. A surface average corrosion rate as a function of time was also obtained from the nanoCorr instrument by averaging the anodic current density detected from the electrode wire probes yielding anodic current.

A Pyrex glass beaker holding 500 ml test solution was used as the test cell. The coupled multi-electrode array sensor probe, a Ag/AgCl (3M KCl) reference electrode was placed in a Lugin probe with the opening close to the multi-electrode sensor probe, and two temperature sensor probes (i.e., a thermal couple and a resistance temperature detector with stainless steel sheath) were mounted on a Teflon® cell cover and immersed in the solution in the beaker. The Teflon cover was used to minimize solution loss during the experiment and also used to fix the position of the test probes in the cell. A microprocessor control hot-plate was used to heat the solution to the desired temperature during the test. A Teflon coated magnetic stirring bar was also used to agitate the solution during the test. The solution was exposed to the air during the test.

Super Concentrate Formulation Examples

Examples of super concentrate heat transfer fluid additive formulations are shown in Tables 4, 5, 6, and 7. The storage stability of super concentrate heat transfer fluid additive formulations at room temperature, 140° F., and 100° C. are also shown in the tables. The pH and the concentration range of the components in the formulation had an effect on the storage stability of the formulated additives. Surprisingly, higher solution pH, and a higher concentration of insoluble salts forming constituents such as $Ca^{2+}$, $Mg2^+$, and phosphate ions tend to result in less storage stability in the formulated additive fluids. Also surprisingly, the concentration range of ethylene glycol in the formulations enhanced the storage stability of super concentrate additive formulations, as shown by the results in Table 5 (cf. Examples 10 to 19 vs. Comparative Examples 1 & 2).

TABLE 4

Super Concentrate Formulation Examples.

| | Super Concentrate Formulation ID | | | | | | | | |
|---|---|---|---|---|---|---|---|---|---|
| | Ex 1 | Ex 2 | Ex 3 | Ex 4 | Ex 5 | Ex 6 | Ex 7 | Ex 8 | Ex 9 |
| Ingredients | | | | | | | | | |
| Ethylene Glycol | 40.0000 | 19.9992 | 0.0000 | 20.0016 | 0.0000 | 0.0000 | 0.0000 | 19.9960 | 20.0000 |
| DI $H_2O$ | 25.1300 | 10.2596 | 52.6419 | 32.6393 | 89.9036 | 92.4277 | 62.5000 | 8.7983 | 8.8000 |
| $H_3PO_4$, 75% | 25.5000 | 51.0000 | 25.4989 | 25.4994 | 5.1000 | 3.8250 | 25.5000 | 50.9899 | 50.9999 |
| AR-940, Sodium polyacrylate (MW = 2600) aqueous solution, 40% solid, pH = 8.3 | 7.0000 | 14.0014 | 7.0002 | 7.0018 | 1.4 | 1.05 | 9.0000 | 14.0172 | 14.0000 |
| $Ca(Ac)_2$*$H_2O$, MW = 176.18 | 0.1700 | 0.3400 | 0.1702 | 0.1698 | 0.0340 | 0.0255 | 0.4000 | 0.9997 | 1.0001 |
| Magnesium Acetate tetrahydrate, MW = 214.45 | 2.2000 | 4.3998 | 2.2001 | 2.1990 | 0.4400 | 0.3300 | 2.6000 | 5.1989 | 5.2001 |
| Sodium Hydroxide, 50% | | | 12.4886 | 12.4891 | 3.1224 | 2.3418 | 0.0000 | 0.0000 | |
| Total, % | 100.0000 | 100.0000 | 100.0000 | 100.0000 | 100.0000 | 100.0000 | 100.0000 | 100.0000 | 100.0000 |
| pH as is, measured by tester #1 | | | 4.00 | 3.20 | 5.20 | 5.40 | | | |
| pH as is, measured by tester #2 | | 0.0 | 3.67 | 3.81 | 5.00 | 5.04 | 1.51 | 1.14 | |
| Note | Soln clear, no ppt | Soln clear, no ppt | Soln clear, no ppt | Soln clear, no ppt | Soln clear, no ppt | Soln clear, no ppt | Soln very slight tint, no ppt | Soln very slight tint, no ppt | No ppt |
| Storage stability Test Results Days in Oven, no ppt observed | | | | | | | | | |
| 100 C. Storage stability | >33 days | >54 days | >30 days | >30 days | ppt observed after 3 days | ppt observed after 16 days | >80 days | >4 wks | |
| 140 F. Storage Stability | | | >80 days | >80 days | >69 days | >65 days | >80 days | >4 wks | |
| Room Temperature Storage Stability | | Clear, no ppt after 18 months | Clear, no ppt after 7 months | Clear, no ppt after 7 months | | | | Clear, no ppt after 5 months | Clear, no ppt after 5 months |

TABLE 5

Super Concentrate Formulation Examples.

| | Example ID | | | | | | |
|---|---|---|---|---|---|---|---|
| | Ex 10 | Ex 11 | Ex 12 | Ex 13 | Ex 14 | Ex 15 | Ex 16 |
| Ingredients | | | | | | | |
| Ethylene Glycol | 20.0000 | 20.0000 | 19.9920 | 20.9979 | 20.0000 | 20.0000 | 15.0000 |
| DI $H_2O$ | 9.6000 | 9.5000 | 9.8010 | 8.7991 | 9.9000 | 9.9000 | 14.6000 |
| $H_3PO_4$, 75% | 50.9999 | 50.9999 | 51.0051 | 51.0049 | 50.9999 | 50.9999 | 51.0000 |
| AR-940, Sodium polyacrylate (MW = 2600) aqueous solution, 40% solid, pH = 8.3 | 14.0000 | 14.0000 | 14.0014 | 13.9986 | 14.0000 | 14.0000 | 14.0000 |
| $Ca(Ac)_2 \cdot H_2O$, MW = 176.18 | 0.8001 | 0.9000 | 0.8001 | 0.8000 | 0.7001 | 0.7001 | 0.8000 |
| Magnesium Acetate tetrahydrate, MW = 214.45 | 4.6000 | 4.6001 | 4.4005 | 4.3995 | 4.4000 | 4.4000 | 4.6000 |
| Sodium Hydroxide, 50% | 0.0000 | 0.0000 | 0.0000 | 0.0000 | 0.0000 | 0.0000 | 0.0000 |
| Total, % | 100.0000 | 100.0000 | 100.0000 | 100.0000 | 100.0000 | 100.0000 | 100.0000 |
| pH as is, measured by tester #1 | | | | | | | |
| pH as is, measured by tester #2 | 0.3 | 0.4 | 0.2 | 0.2 | 0.3 | 0.3 | <1 |
| Note | No ppt | No ppt after stirring overnight | No ppt after stirring overnight | No ppt | No ppt | No ppt | No ppt |
| Days in Oven, no ppt observed | | | | | | | |
| 100 C. Storage stability | >2 wks | >2 wks | >2 wks | >2 wks | >2 wks | >2 wks | >2 wks |
| 140 F. Storage Stability | | | | | | | >4 wks |
| Room Temperature Storage Stability | | | | | Clear, no ppt after 5 months | Clear, no ppt after 5 months | Clear, no ppt after 5 months |

| | Example ID | | | | |
|---|---|---|---|---|---|
| | Comp Ex 1 | Comp Ex 2 | Ex 17 | Ex 18 | Ex 19 |
| Ingredients | | | | | |
| Ethylene Glycol | 10.0000 | 5.0000 | 34.9998 | 31.2000 | 25.6875 |
| DI $H_2O$ | 19.5999 | 24.6000 | 12.5201 | 12.8160 | 13.0800 |
| $H_3PO_4$, 75% | 50.9997 | 51.0000 | 38.2452 | 40.8000 | 44.6250 |
| AR-940, Sodium polyacrylate (MW = 2600) aqueous solution, 40% solid, pH = 8.3 | 13.9999 | 14.0000 | 10.4987 | 11.2000 | 12.2500 |
| $Ca(Ac)_2 \cdot H_2O$, MW = 176.18 | 0.8004 | 0.8000 | 0.4351 | 0.4640 | 0.5075 |
| Magnesium Acetate tetrahydrate, MW = 214.45 | 4.6001 | 4.6000 | 3.3011 | 3.5200 | 3.8500 |
| Sodium Hydroxide, 50% | 0.0000 | 0.0000 | | | |
| Total, % | 100.0000 | 100.0000 | 100.0000 | 100.0000 | 100.0000 |
| pH as is, measured by tester #1 | | | | | |
| pH as is, measured by tester #2 | <1 | <1 | <1 | <1 | <1 |
| Note | Soln very slight tint, no ppt | Soln very slight tint, no ppt | No ppt | No ppt | No ppt |
| Days in Oven, no ppt observed | | | | | |
| 100 C. Storage stability | | | >2 wks | >2 wks | >2 wks |
| 140 F. Storage Stability | | | | | |
| Room Temperature Storage Stability | Trace ppt observed after 4 wks | Ppt observed after 3.5 wks | Clear, no ppt after 2 months | Clear, no ppt after 2 months | Clear, no ppt after 2 months |

TABLE 6

Super Concentrate Formulation Comparative Examples.

| | Comp Ex 3 | Comp Ex 4 | Comp Ex 5 | Comp Ex 6 | Comp Ex 7 | Comp Ex 8 | Comp Ex 9 |
|---|---|---|---|---|---|---|---|
| Ingredients | | | | | | | |
| Ethylene Glycol | 20.0000 | 20.0000 | 20.0000 | 20.0000 | 0.0000 | 20.2664 | 20.0000 |
| DI $H_2O$ | 71.0221 | 71.2562 | 57.3091 | 58.5581 | 13.3655 | 29.9700 | 30.7667 |
| $H_3PO_4$, 75% | 3.8250 | 3.8250 | 10.2 | 10.2000 | 40.6640 | 25.8417 | 25.5000 |
| AR-940, Sodium polyacrylate (MW = 2600) aqueous solution, 40% solid, pH = 8.3 | 1.0500 | 1.0500 | 2.8 | 2.8 | 11.1609 | 7.0943 | 7.0000 |
| $Ca(Ac)_2*H_2O$, MW = 176.18 | 0.0255 | 0.0255 | 0.068 | 0.0680 | 0.2705 | 0.1725 | 0.1700 |
| Magnesium Acetate tetrahydrate, MW = 214.45 | 0.3300 | 0.3300 | 0.88 | 0.8800 | 3.5075 | 2.2294 | 2.2000 |
| Sodium Hydroxide, 50% | 3.7469 | 3.5128 | 8.7429 | 7.4939 | 31.0316 | 14.4257 | 14.3633 |
| Uranine Dye, 40% | 0.0005 | 0.0005 | | | | | |
| Total, % | 100.0000 | 100.0000 | 100.0000 | 100.0000 | 100.0000 | 100.0000 | 100.0000 |
| pH as is, measured by tester #1 | | | | | | | 4.60 |
| pH as is, measured by tester #2 | ~6.7 | ~6.69 | ~6.34 | ~5.83 | ~5.5 | ~5.0 | 4.64 |
| Note | turbid | Clear, no ppt | Turbid, some ppt | Soln clear, no ppt. | Soln turbid upon cool down | Soln clear, no ppt | Soln clear, no ppt |
| Days in Oven, no ppt observed | | | | | | | |
| 100 C. Storage stability | | | | | | 3 days | 1 day |
| 140 F. Storage Stability | | 5 days | | 5 days | | | 2 days |
| Room Temperature Storage Stability | | | | | | | |

| | Comp Ex 10 | Comp Ex 11 | Comp Ex 12 | Comp Ex 13 | Comp Ex 14 |
|---|---|---|---|---|---|
| Ingredients | | | | | |
| Ethylene Glycol | 0.0000 | 0.0000 | 0.0000 | 10.0000 | 20.0000 |
| DI $H_2O$ | 78.5581 | 79.1826 | 79.8071 | 69.8071 | 69.9036 |
| $H_3PO_4$, 75% | 10.2000 | 10.2000 | 10.2000 | 10.2000 | 5.1000 |
| AR-940, Sodium polyacrylate (MW = 2600) aqueous solution, 40% solid, pH = 8.3 | 2.8 | 2.8 | 2.8 | 2.8 | 1.4 |
| $Ca(Ac)_2*H_2O$, MW = 176.18 | 0.0680 | 0.0680 | 0.0680 | 0.0680 | 0.0340 |
| Magnesium Acetate tetrahydrate, MW = 214.45 | 0.8800 | 0.8800 | 0.8800 | 0.8800 | 0.4400 |
| Sodium Hydroxide, 50% | 7.4939 | 6.8694 | 6.2449 | 6.2449 | 3.1224 |
| Uranine Dye, 40% | | | | | |
| Total, % | 100.0000 | 100.0000 | 100.0000 | 100.0000 | 100.0000 |
| pH as is, measured by tester #1 | | | | | |
| pH as is, measured by tester #2 | ~5.76 | 5.45 | 5.01 | 5.03 | 5.07 |
| Note | Soln clear, no ppt | Soln clear, no ppt | Soln clear, no ppt | Soln clear, no ppt | Soln clear, no ppt |
| Days in Oven, no ppt observed | | | | | |
| 100 C. Storage stability | | 1 day | 1 day | 1 day | 3 days |
| 140 F. Storage Stability | 5 days | 1 day | 1 day | 5 days | 3 days |
| Room Temperature Storage Stability | | | | | |

TABLE 7

Super Concentrate Formulation Examples.

| Ingredients | Ex. 20 | Ex. 21 | Comp Ex. 15 | Comp. Ex. 16 | Comp. Ex. 17 |
|---|---|---|---|---|---|
| Ethylene Glycol | 23.2526 | 23.2518 | 19.8753 | 23.2511 | 13.2513 |
| DI H$_2$O | 26.6687 | 31.3587 | 12.7801 | 31.8520 | 17.8822 |
| AR-940, Sodium polyacrylate (MW = 2600) aqueous solution, 40% solid, pH = 8.3 | 7.0009 | 6.9995 | 10.5004 | 7.0009 | 7.0007 |
| Ca(Ac)$_2$*H$_2$O, MW = 176.18 | 0.2900 | 0.2900 | 0.4350 | 0.2900 | 0.2900 |
| Magnesium Acetate tetrahydrate, MW = 214.45 | 2.1999 | 2.2002 | 3.3000 | 2.2003 | 2.2002 |
| H2NaPO4*2H2O | 40.5880 | | | | |
| H2NaPO4*H2O Powder | | 35.8998 | | | |
| HK2PO4*3H2O powder | | | | | 59.3755 |
| H2KPO4 powder | | | 53.1092 | 35.4057 | |
| Total, % | 100.0000 | 100.0000 | 100.0000 | 100.0000 | 100.0000 |
| pH, 50% solution | 4.75 | 4.77 | | | |
| Storage Stability at room temperature | Clear, no ppt for >7 days | Clear, no ppt for >7 day | Not Soluble | Not Soluble | Not Soluble |

Note:
Heat transfer fluids produced from using super concentrate fluid Ex. 20 and Ex. 21 were stable after storage at room temperature for greater than 6 months.

The super concentrate formulations in Examples 1-9 of Table 4 exhibited good storage stability (e.g., clear solutions without precipitate). Examples 2 through 8 in Table 4 correspond to formulations having acidic pH values ranging from 0.0 to 5.04. Similarly, the super concentrate formulations in Examples 10-19 of Table 5 likewise exhibited good storage stability (e.g., clear solutions without precipitate) at acidic pH values—particularly when the amount of ethylene glycol present was at least about 15 wt. %. By contrast, as shown by Comparative Examples 1 and 2 in Table 5, the room temperature storage stability was not quite as good when lesser amounts of ethylene glycol (i.e., 5 wt. % and 10 wt. %, respectively) were used. As shown by Comparative Example 3 in Table 6, a super concentrate formulation having a basic pH of 6.7 resulted in a turbid solution indicative of poor storage stability. Surprisingly and unexpectedly, as shown by the data in Table 7, super concentrate formulations having an acidic pH of less than 4.9 were stable after storage at room temperature for greater than six months.

Super concentrate additive compositions in accordance with the present teachings were used to produce organic acid technology (OAT) coolants of different formulations. The OAT coolants were then subjected to NanoCorr coupled multi-electrode sensor testing as described above and analogous to the procedure described in the article entitled "New Electrochemical Methods for the Evaluation of Localized Corrosion in Engine Coolants" (*Journal of ASTM International*, 2006, 4, No. 1, pages 1-14). Four different OAT coolants A-D were prepared from a super concentrate additive in accordance with the present teachings. The composition of coolants A-D is summarized in Table 8 below. The NanoCorr test data obtained for coolants A-D are summarized in FIGS. 1-4, respectively. In FIGS. 1-4, CR_max represents localized corrosion rate and CR_avg represents a surface area average corrosion rate as a function of time (every 30 seconds).

TABLE 8

Figure 3:
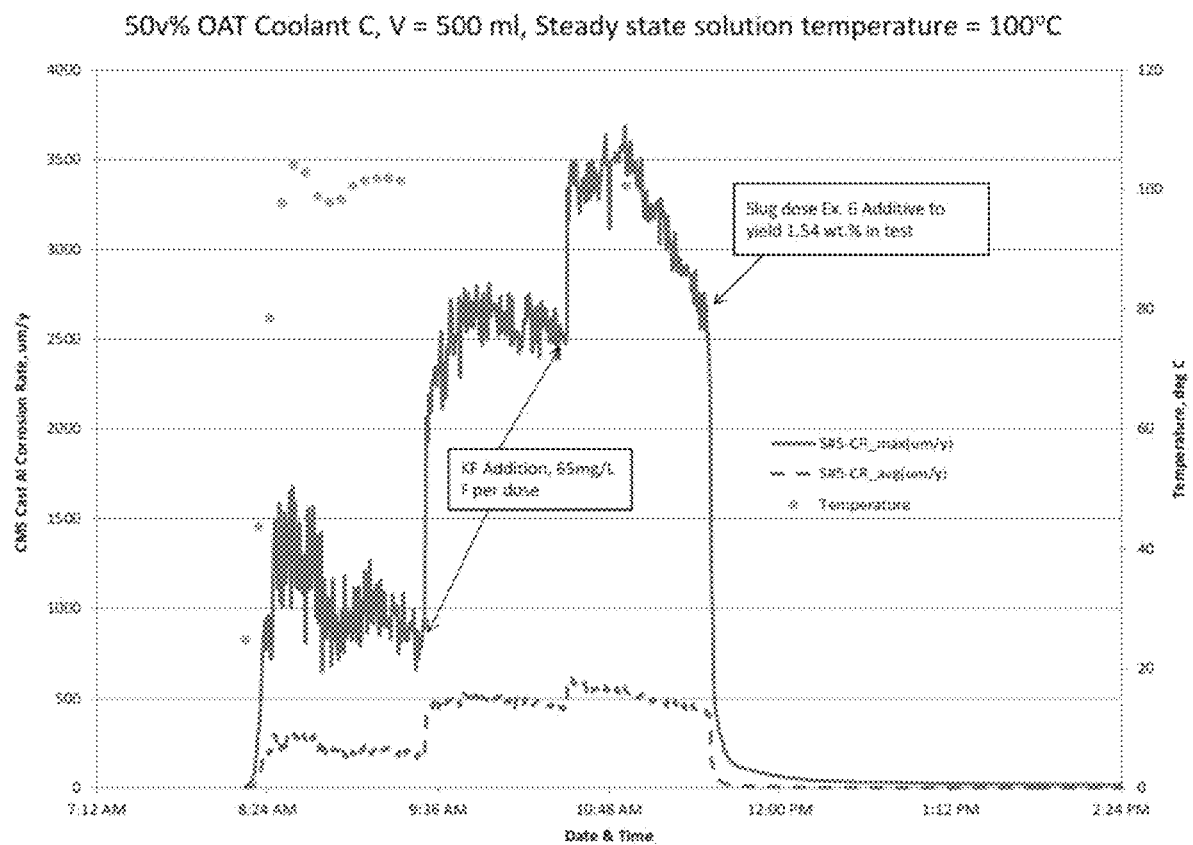
FIG. 3 shows the effect of a slug dose of heat transfer fluid super concentrate additive on corrosion of cast aluminum SAE329 in 50 vol. % commercial OAT coolant C in the presence of 130 ppm fluoride ions.
Figure 4:
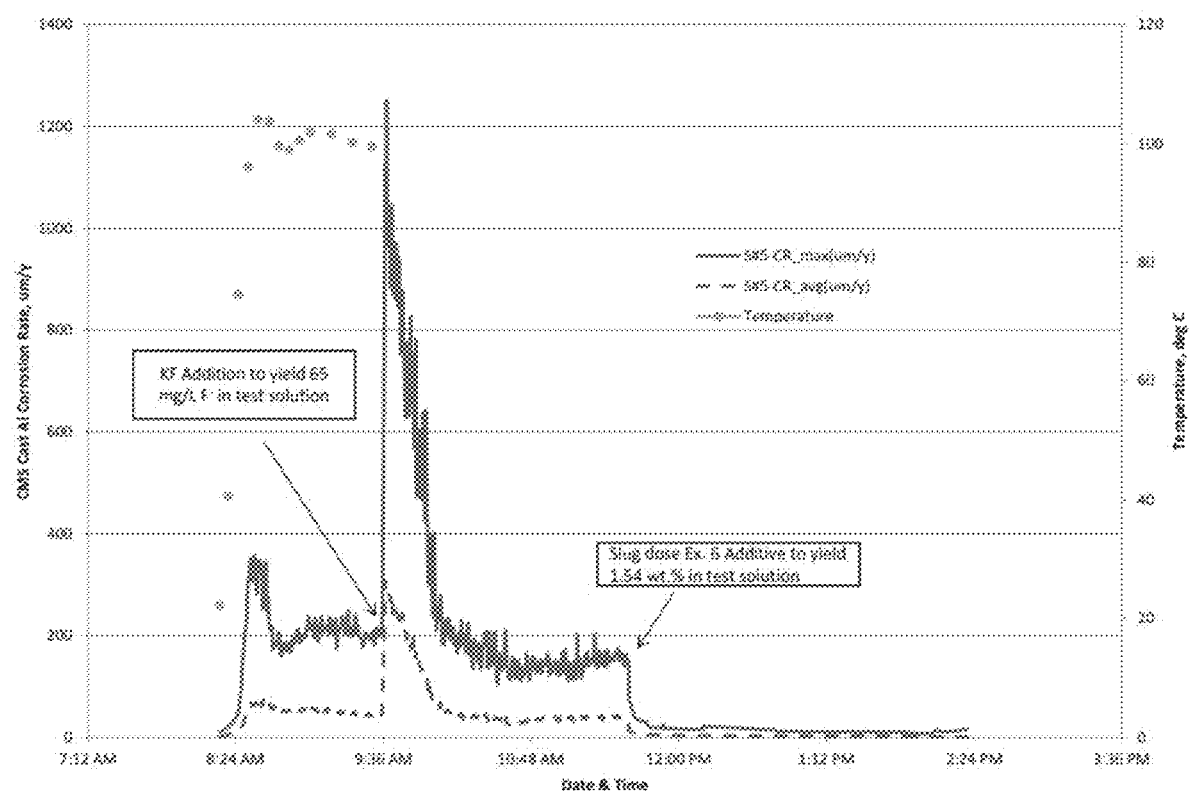
FIG. 4 shows the effect of a slug dose of heat transfer fluid super concentrate additive on corrosion of cast aluminum SAE329 in 50 vol. % commercial OAT coolant D in the presence of 65 ppm fluoride ions.
Figure 5:
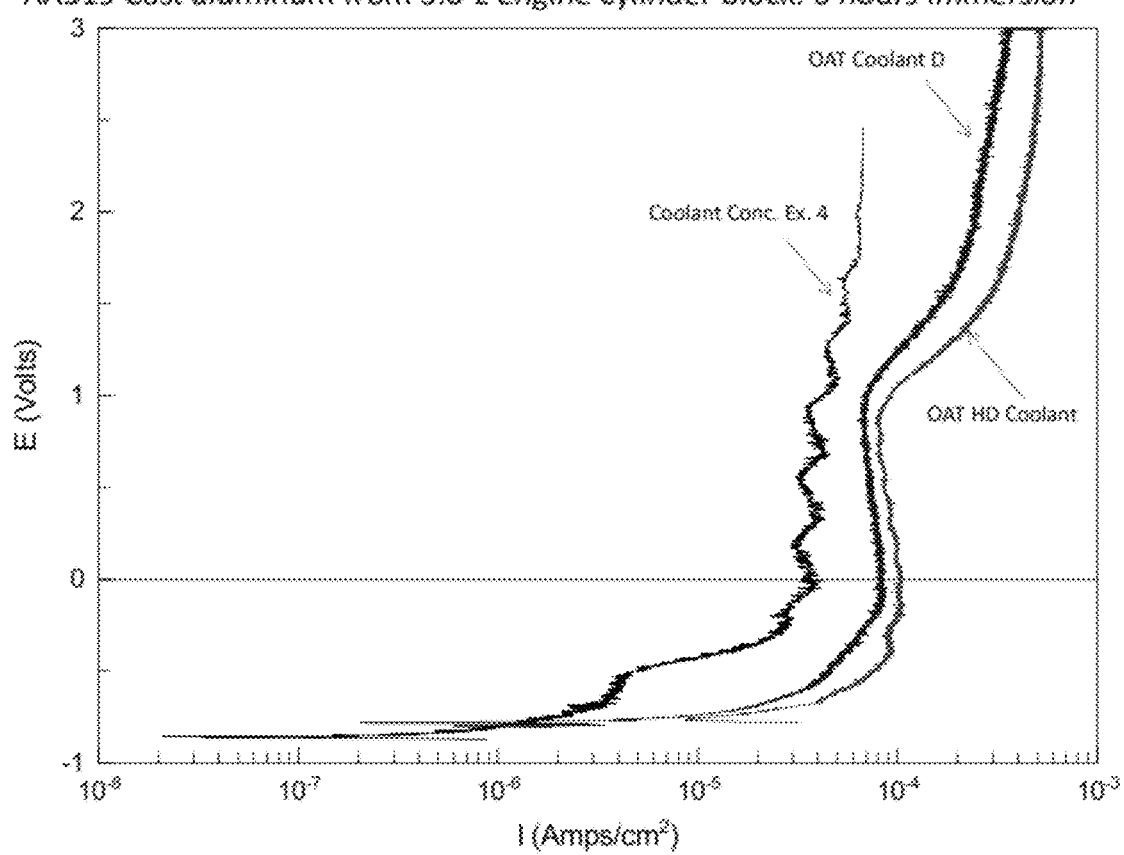
FIG. 5 shows the anodic polarization curve measurements obtained on an AA319 cast aluminum alloy electrode immersed in 25 vol. % coolant concentrate+100 ppm chloride ions for 6 hours under the heat rejection heat transfer conditions.

Composition of Test Coolants Used in NanoCorr tests Shown in FIGS. 1-4 and Anodic Polarization Curve Test shown in FIG. 5.

| Ingredient | OAT Coolant A | OAT Coolant B | OAT Coolant C | OAT Coolant D | OAT HD Coolant |
|---|---|---|---|---|---|
| Ethylene Glycol | >90% | >90% | >90% | >90% | >90% |
| 2-Ethyl hexanoic acid | 2.5 to 3% | 2.5 to 3% | 2.5 to 3% | ND | ND |
| Sebacic acid | ND | ND | 0.2 to 0.6% | ND | ND |
| Neodecanoic acid | <1% | <1% | ND | ND | ND |
| Benzoic acid | ND | ND | ND | 1.3 to 1.5% | 3 to 3.5% |
| t-Butyl benzoic acid | ND | ND | ND | 1.8 to 2.2% | 1.8 to 2.2% |
| p-Toluic acid | ND | ND | ND | ND | 1 to 1.2% |
| Tolytriazole | 0.1 to 0.25% | 0.1 to 0.25% | 0.1 to 0.25% | 0.2 to 0.4% | 0.2 to 0.4% |
| NaOH | Present | Present | Present | Present | Present |
| KOH | ND | ND | ND | Present | Present |
| Molybdate | ND | ND | ND | ND | Present |
| Antifoam, Dyes or other coolant additives | Present | Present | Present | Present | Present |
| Water | Present | Present | Present | Present | Present |
| Total, wt % | 100 | 100 | 100 | 100 | 100 |

ND = Not detected

As shown in FIGS. 1-4, the corrosion rates generally increased with increasing temperature under constant conditions. The corrosion rates also tended to decrease slowly with increasing immersion/exposure time. Addition of fluoride ion increased the corrosion rates of aluminum alloy (cast aluminum SAE 329, UNS23190 was used in the tests) greatly. Potassium fluoride additions yielded a fluoride concentration of about 65 ppm $F^-$ at each single slug dose. The addition of the selected fluoride concentrations in the coolant solutions was intended to simulate the coolant composition after it was installed in a vehicle engine cooling system having a radiator and a heater core manufactured from the now commonly adopted controlled atmosphere brazing process where fluoride containing flux. The Nano-Corr results show that the aluminum alloy corrosion rates typically increased when the fluoride concentration increased (i.e., the corrosion rates were higher when the fluoride was increased to about 130 ppm after the addition of the second dose of KF). As shown in FIGS. 1-4, the addition of a single slug dose (27 g to yield~4.63 wt %) of a super concentrate additive (Example 6 from Table 4) in accordance with the present teachings was effective in reducing the corrosion rate even in the presence of a high concentration of fluoride ions (up to about 130 ppm $F^-$) for all four OAT based coolants A-D. The volume of the 50 vol. % coolant used in the test was 500 ml.

Figure 2:
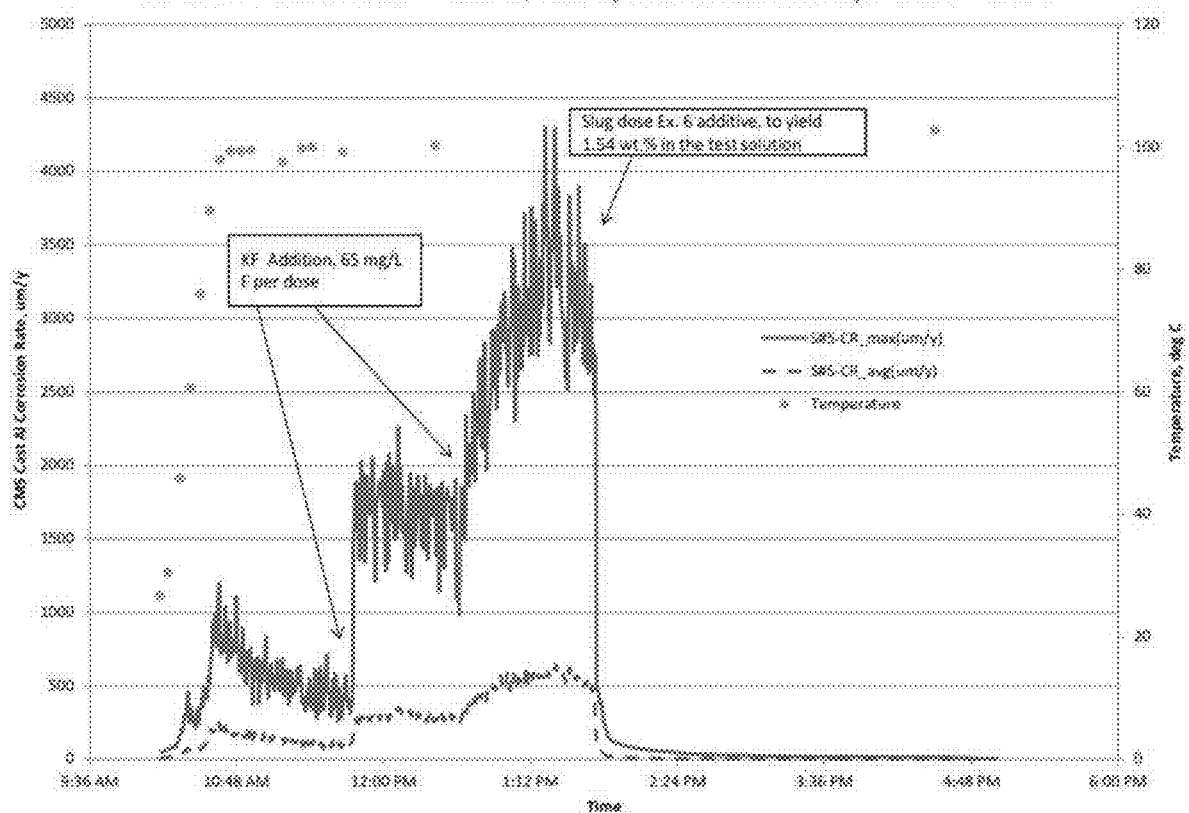
FIG. 2 shows the effect of a slug dose of heat transfer fluid super concentrate additive on corrosion of cast aluminum SAE329 in 50 vol. % commercial OAT coolant B in the presence of 130 ppm fluoride ions.

For example, as shown in FIG. 1, each slug dose (1 gram, 40 vol. %) of KF—once at approximately 11:30 am and again at approximately 12:21 pm—resulted in a sharp increase in the local corrosion rate observed by the Nano-Corr testing. Upon the addition of a slug dose of the super concentrate additive at approximately 1:27 pm, the local corrosion rate dropped precipitously. The results shown in each of FIGS. 2-4 are analogous to those shown in FIG. 1.

The addition of KF in the NanoCorr experiments summarized in FIGS. 1-4 was a way to quickly simulate results of the coolant aging process in an engine cooling system after exposure to the Controlled Atmosphere Brazing method under cooling system operating conditions. The OAT coolants, as shown in Table 8 above, were ethylene glycol based commercial engine coolants containing sodium or potassium salts of aliphatic or aromatic carboxylic acids (selecting at least two acids from the groups including 2-ethylhexanoic acid, neodecanoic acid, sebacic acid, benzoic acid, and t-butyl benzoic acid), an azole compound (typically tolytriazole), antifoam, colorants and sufficient NaOH or KOH. The pH of the 50 vol. % coolant solution after it was diluted by adding deionized water was between 8 and 9.

The super concentrate heat transfer fluid additives can also be used to produce heat transfer fluid concentrate (or engine coolant concentrate) suitable for market or commercial applications. Table 9 shows examples of heat transfer fluid concentrates made from the super concentrate coolant additives shown in Example 8 of Table 4 and in Examples 18 and 19 of Table 5.

TABLE 9

Use of Super Concentrate Pack 1 and Pack 2 to blend Heat Transfer Fluid Concentrate.

| Ingredient | SC Pack 2-A wt % | SC Pack 2-B wt % | Coolant Concentrate Ex. 1 wt % | Coolant Concentrate Ex. 2 wt % | Coolant Concentrate Ex. 3 wt % | Coolant Concentrate Ex. 4 wt % |
|---|---|---|---|---|---|---|
| Ethylene Glycol | 37.1820 | 39.3000 | 91.0023 | 90.1486 | 90.1974 | 90.9908 |
| Neo Decanoic Acid | 9.5900 | 9.5900 | | | | |
| 2-Ethyl Hexanoic Acid | 28.7700 | 28.7700 | | | | |
| NaOH, 50% | 19.7380 | 19.8400 | | | | |
| Sodium Tolytriazole, 50% | 4.7200 | 2.5000 | | | | |
| SC Pack 1, Ex 8 in Table 4 | | | 0.5001 | | | 0.4999 |
| SC Pack 1, Ex. 18 in Table 5 | | | | 0.6255 | | |
| SC Pack 1, Ex. 19 in Table 5 | | | | | 0.5717 | |
| Sodium Hydroxide, 50% | | | 0.2705 | 0.2752 | 0.2754 | 0.2845 |
| Uranine Yellow Liquid Dye, 40% | | | 0.0010 | 0.0011 | 0.0010 | 0.0010 |
| Super Concentrate Pack 2, SC Pack 2-A | | | 8.0261 | 8.0274 | 8.0275 | |
| Super Concentrate Pack 2, SC Pack 2-B | | | | | | 8.0238 |
| PM 5150, antifoam | | | 0.2000 | 0.2003 | 0.2002 | 0.2000 |
| Treated Water or Deionized water | | | | 0.7220 | 0.7268 | |
| Sum | 100.0000 | 100.0000 | 100.0000 | 100.0000 | 100.0000 | 100.0000 |
| pH @ 50% actual | 9.6 | 9.2 | 8.22 | 8.26 | 8.22 | 8.23 |
| 50 v % coolant Freeze point, ASTM D6660 | | | −35.5° F. | −34.2° F. | −34.6° F. | −34.8° F. |
| Water content, wt % | NA | 15.43 | 1.74 | 2.74 | 2.67 | 1.71 |

The heat transfer fluid concentrate fluid examples shown in Table 9, which were made from the disclosed super concentrate heat transfer fluid additives, were homogeneous single liquid solutions. They had very low water content and met ASTM D3306 requirements on freeze point requirements and other physical and chemical properties, as well as corrosion protection performance requirements. A lower water content in the glycol based heat transfer fluid concentrate tended to have a lower freeze point when it was diluted to 50 vol. % ready-to-use coolant solution for addition into the vehicle engine cooling systems. This met the standard requirements specified by vehicle manufacturers, ASTM, and SAE, as well as government agencies.

FIG. 5 shows the anodic polarization measurements obtained on an AA319 cast aluminum alloy electrode immersed in 25 vol. % coolant concentrate+100 ppm chloride ions for 6 hours under the heat rejection heat transfer conditions. The AA319 electrode surface temperature is 130° C. One can see that the coolant concentrate (Ex. 4 in Table 5) prepared by using the super concentrate heat transfer additives Ex. 8 in Table 4 provided much better corrosion protection (yielding 15 to 20 times lower corrosion rate) for the AA319 cast aluminum cut from 3.0 L vehicle engine block than the two OAT commercial coolants under the test conditions.

The entire contents of each and every patent and non-patent publication cited herein are hereby incorporated by reference, except that in the event of any inconsistent disclosure or definition from the present specification, the disclosure or definition herein shall be deemed to prevail.

It is to be understood that use of the indefinite articles "a" and "an" in reference to an element (e.g., "a freezing point depressant," "a water soluble polymer," etc.) does not exclude the presence, in some embodiments, of a plurality of such elements.

The foregoing detailed description and the accompanying drawings have been provided by way of explanation and illustration, and are not intended to limit the scope of the appended claims. Many variations in the presently preferred embodiments illustrated herein will be apparent to one of ordinary skill in the art, and remain within the scope of the appended claims and their equivalents.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding claim—whether independent or dependent—and that such new combinations are to be understood as forming a part of the present specification.

The invention claimed is:

1. A super concentrate additive solution comprising:
a) water;
b) a freezing point depressant;
c) phosphoric acid;
d) a water soluble polymer; and
e) a compound selected from the group consisting of a magnesium compound, a lithium compound, a calcium compound, a strontium compound and combinations thereof;
wherein a pH of the super concentrate additive solution is less than about 5.5; and
wherein the super concentrate additive solution is a single phase homogeneous solution at room temperature.

2. The super concentrate additive solution of claim 1, wherein the water is softened water or deionized water.

3. The super concentrate additive solution of claim 1, wherein the freezing point depressant is a glycol.

4. The super concentrate additive solution of claim 3, wherein the glycol is ethylene glycol, propylene glycol, or a combination thereof.

5. The super concentrate additive solution of claim 1, wherein the phosphoric acid is an alkali metal phosphate salt.

6. The super concentrate additive solution of claim 5, wherein the alkali metal phosphate salt is selected from the group consisting of mono-alkali-metal phosphate salts, di-alkali-metal phosphate salts, tri-alkali-metal phosphate salts, hydrates of the alkali metal phosphate salts, and mixtures thereof.

7. The super concentrate additive solution of claim 5, wherein the alkali metal phosphate salt is selected from the group consisting of monosodium phosphate, monopotassium phosphate, disodium phosphate, dipotassium phosphate, trisodium phosphate, tripotassium phosphate, monosodium phosphate monohydrate, monosodium phosphate dehydrate, disodium phosphate dihydrate, disodium phosphate heptahydrate, disodium phosphate octahydrate, disodium dodecahydrate, trisodium phosphate, trisodium phosphate hemihydrate, trisodium phosphate hexahydrate, trisodium phosphate octahydrate, trisodium phosphate dodecahydrate, and combinations thereof.

8. The super concentrate additive solution of claim 1, wherein the water soluble polymer comprises homopolymers, copolymers, terpolymers, or inter-polymers having (a) at least one monomeric unit containing a $C_3$ to $C_{16}$ monoethylenically unsaturated mono- or dicarboxylic acid or their alkali metal or ammonium salts; or (b) at least one monomeric unit containing a $C_3$ to $C_{16}$ monoethylenically unsaturated mono- or dicarboxylic acid derivative.

9. The super concentrate additive solution of claim 1, wherein the calcium compound is selected from the group consisting of calcium hydroxide, calcium molybdate, calcium vanadate, calcium tungstate, calcium perchlorate, calcium chloride, hydrates of these salts, and combinations thereof.

10. The super concentrate additive solution of claim 1, wherein the calcium compound is a calcium salt formed between calcium ions and an organic acid containing one or more carboxylic acid groups.

11. The super concentrate additive solution of claim 10, wherein the organic acid is selected from the group consisting of calcium acetate, calcium formate, calcium propionate, calcium polymaleate, calcium polyacrylate, calcium lactate, calcium gluconate, calcium glycolate, calcium glucoheptonate, calcium citrate, calcium tartrate, calcium glucarate, calcium succinate, calcium hydroxysuccinate, calcium adipate, calcium oxalate, calcium malonate, calcium sulfamate, hydrates of the calcium salts, and combinations thereof.

12. The super concentrate additive solution of claim 1, wherein the calcium compound is a calcium salt formed between calcium ions and a phosphonate or a phosphinate.

13. The super concentrate additive solution of claim 12, wherein the calcium salt is selected from the group consisting of calcium-PBTC, where PBTC is 2-phosphonobutane-1,2,4-tricarboxylic acid salts; calcium-HEDP, where HEDP is 1-hydroxyethane-1,1-diphosphonic acid salts; calcium-HPA, where HPA is hydroxyphosphono-acetic acid or 2-hydroxy phosphono acetic acid salts; calcium phosphonosuccinic acid salts; calcium-PSO, where PSO is mono, bis and oligomeric phosphinosuccinic acid adduct mixture salts; and combinations thereof.

14. The super concentrate additive solution of claim 1, wherein the magnesium compound is selected from the group consisting of magnesium molybdate, magnesium hydroxide, magnesium tungstate, magnesium sulfate, magnesium perchlorate, magnesium chloride, hydrates of the salts, and combinations thereof.

15. The super concentrate additive solution of claim 1, wherein the magnesium compound is a magnesium salt formed between magnesium ions and an organic acid containing one or more carboxylic acid groups, or one or more phosphonic acid groups, or one or more phosphinic acid groups.

16. The super concentrate additive solution of claim 15, wherein the organic acid is selected from the group consisting of magnesium formate, magnesium acetate, magnesium propionate, magnesium polyacrylate, magnesium polymaleate, magnesium lactate, magnesium gluconate, magnesium glycolate, magnesium glucoheptonate, magnesium citrate, magnesium tartrate, magnesium glucarate, magnesium succinate, magnesium hydroxysuccinate, magnesium adipate, magnesium oxalate, magnesium malonate, magnesium sulfamate, magnesium-PBTC salt where PBTC is 2-phosphonobutane-1,2,4-tricarboxylic acid, magnesium-HEDP salt where HEDP is 1-hydroxyethane-1,1-diphosphonic acid, magnesium -HPA salt where HPA is hydroxyphosphono-acetic acid or 2-hydroxy phosphono acetic acid, magnesium phosphonosuccinic acid salts, magnesium-PSO salt where PSO is mono, bis and oligomeric phosphinosuccinic acid adduct mixtures, hydrates of the salts, and combinations thereof.

17. The super concentrate additive solution of claim 1 further comprising an alkali metal molybdate, an alkali earth metal molybdate, or a mixture of an alkali metal molybdate and an alkali earth metal molybdates.

18. The super concentrate additive solution of claim 1 further comprising:
   colorants; antifoams; pH adjusting agents; water soluble inorganic phosphates; phosphonates;
   phosphonates; biocides; azole compounds; one or more $C_6$ to $C_{18}$ mono or dibasic aliphatic or aromatic carboxylic acids, or salts thereof; or combinations thereof.

19. A method of improving corrosion protection performance comprising adding the super concentrate additive solution of claim 1 to a heat transfer fluid.

20. The method of claim 19, further comprising adding the mixed heat transfer fluid and super concentrate additive solution to a heat transfer system.

21. A super concentrate additive solution comprising:
   a) water in an amount ranging from about 14% to about 38% by weight based on total weight of the super concentrate additive solution;
   b) a freezing point depressant in an amount ranging from about 12% to about 60% by weight based on total weight of the super concentrate additive solution;
   c) phosphoric acid in an amount ranging from about 1% to about 55% by weight based on total weight of the super concentrate additive solution;
   d) a water soluble polymer in an amount ranging from about 0.15% to about 20% by weight based on total weight of the super concentrate additive solution;
   e) a calcium compound comprising calcium ion in an amount ranging from about 0.1 mg/L to about 20,000 mg/L; and
   f) a magnesium compound comprising magnesium ion in an amount ranging from about 0.1 mg/L to about 15,000 mg/L;
      wherein the super concentrate additive solution is a single phase homogeneous solution at room temperature;
      wherein a pH of the super concentrate additive solution is less than about 5.5; and
      wherein the super concentrate additive solution is substantially free of precipitate after storage at room temperature for at least one week.

22. The super concentrate additive solution of claim 21, wherein the super concentrate additive solution is substantially free of precipitate after storage at room temperature for at least one month.

23. The super concentrate additive solution of claim 21, wherein the super concentrate additive solution is substantially free of precipitate after storage at room temperature for at least two months.

24. The super concentrate additive solution of claim 21, wherein the super concentrate additive solution is substantially free of precipitate after storage at room temperature for at least five months.

25. The super concentrate additive solution of claim 21, wherein the super concentrate additive solution is substantially free of precipitate after storage at room temperature for at least six months.

26. The super concentrate additive solution of claim 21, wherein the super concentrate additive solution is substantially free of precipitate after storage at about 100° C. for at least 1 week.

27. The super concentrate additive solution of claim 21, wherein the super concentrate additive solution is substantially free of precipitate after storage at about 100° C. for at least 2 weeks.

28. The super concentrate additive solution of claim 21, wherein the super concentrate additive solution is substantially free of precipitate after storage at about 100° C. for at least 30 days.

29. The super concentrate additive solution of claim 21, wherein the super concentrate additive solution is substantially free of precipitate after storage at about 100° C. for at least 50 days.

30. The super concentrate additive solution of claim 21, wherein the super concentrate additive solution is substantially free of precipitate after storage at about 100° C. for at least 75 days.

31. The super concentrate additive solution of claim 21, wherein the super concentrate additive solution is substantially free of precipitate after storage at about 140° F. for at least 30 days.

32. The super concentrate additive solution of claim 21, wherein the super concentrate additive solution is substantially free of precipitate after storage at about 140° F. for at least 60 days.

33. The super concentrate additive solution of claim 21, wherein the super concentrate additive solution is substantially free of precipitate after storage at about 140° F. for at least 75 days.

34. A super concentrate additive solution comprising:
   a) water in an amount ranging from about 19% to about 35% by weight based on total weight of the super concentrate additive solution;
   b) a freezing point depressant in an amount ranging from about 15% to about 40% by weight based on total weight of the super concentrate additive solution;
   c) phosphoric acid in an amount ranging from about 2% to about 53% by weight based on total weight of the super concentrate additive solution;
   d) a water soluble polymer in an amount ranging from about 0.3% to about 17% by weight based on total weight of the super concentrate additive solution;
   e) a calcium compound comprising calcium ion in an amount ranging from about 50 mg/L to about 12,000 mg/L; and
   f) a magnesium compound comprising magnesium ion in an amount ranging from about 25 mg/L to about 12,000 mg/L
      wherein the super concentrate additive solution is a single phase homogeneous solution at room temperature;
      wherein a pH of the super concentrate additive solution is less than about 5.5; and
      wherein the super concentrate additive solution is substantially free of precipitate after storage under a set of storage conditions selected from the group consisting of room temperature for at least one month, about 100° C. for at least 1 week, about 140° F. for at least 30 days, and combinations thereof.

35. The super concentrate additive solution of claim 34, wherein the super concentrate additive solution is substantially free of precipitate after storage under a set of storage conditions selected from the group consisting of room temperature for at least two months, room temperature for at least five months, room temperature for at least six months, and combinations thereof.

36. The super concentrate additive solution of claim 34, wherein the super concentrate additive solution is substantially free of precipitate after storage under a set of storage conditions selected from the group consisting of about 100° C. for at least 2 weeks, about 100° C. for at least 30 days, about 100° C. for at least 50 days, about 100° C. for at least 75 days, and combinations thereof.

37. The super concentrate additive solution of claim 34, wherein the super concentrate additive solution is substantially free of precipitate after storage under a set of storage conditions selected from the group consisting of about 140° F. for at least 60 days, about 140° F. for at least 75 days, and combinations thereof.

38. A super concentrate additive solution prepared by a process comprising combining water, a freezing point depressant, phosphoric acid, a water soluble polymer, and a compound selected from the group consisting of a magnesium compound, a lithium compound, a calcium compound, a strontium compound, and combinations thereof to form a solution having a pH of less than about 5.5, and wherein the super concentrate additive solution is a single phase homogeneous solution at room temperature.

39. A super concentrate additive solution comprising:
  a) water;
  b) a freezing point depressant;
  c) phosphoric acid;
  d) a water soluble polymer; and
  e) a compound selected from the group consisting of a magnesium compound, a lithium compound, a calcium compound, a strontium compound and combinations thereof;
    wherein a pH of the super concentrate additive solution is less than about 5.5; and
    wherein the super concentrate additive solution is free of fatty acid esters.

* * * * *